United States Patent
Kazmi et al.

(10) Patent No.: US 8,693,463 B2
(45) Date of Patent: *Apr. 8, 2014

(54) NEIGHBOUR CELL QUALITY MEASUREMENT IN A TELECOMMUNICATIONS SYSTEM

(75) Inventors: Muhammad Kazmi, Bromma (SE); George Jongren, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 371 days.

This patent is subject to a terminal disclaimer.

(21) Appl. No.: 12/921,853

(22) PCT Filed: Mar. 9, 2009

(86) PCT No.: PCT/SE2009/050244
§ 371 (c)(1),
(2), (4) Date: Sep. 10, 2010

(87) PCT Pub. No.: WO2009/113951
PCT Pub. Date: Sep. 17, 2009

(65) Prior Publication Data
US 2011/0007657 A1    Jan. 13, 2011

Related U.S. Application Data

(60) Provisional application No. 61/036,198, filed on Mar. 13, 2008.

(51) Int. Cl.
*H04L 1/00* (2006.01)
*H04W 4/00* (2009.01)

(52) U.S. Cl.
USPC .................... 370/352; 370/329; 455/63.1

(58) Field of Classification Search
USPC ............... 370/330, 252, 329; 455/423, 63.1
See application file for complete search history.

(56) References Cited

U.S. PATENT DOCUMENTS

| 5,606,729 | A  | * | 2/1997  | D'Amico et al. | 455/67.11 |
|-----------|----|----|---------|----------------|-----------|
| 7,639,660 | B2 | * | 12/2009 | Kim et al.     | 370/343   |
| 7,940,643 | B2 | * | 5/2011  | Lee et al.     | 370/208   |
| 8,358,979 | B2 | * | 1/2013  | Astely et al.  | 455/63.1  |
| 8,462,711 | B2 |   | 6/2013  | Ishii et al.   |           |
| 2006/0058033 | A1 |   | 3/2006  | Marsan et al. |           |
| 2007/0117566 | A1 |   | 5/2007  | Khawand et al. |          |
| 2007/0270100 | A1 | * | 11/2007 | Agrawal et al. | 455/67.11 |
| 2008/0095108 | A1 | * | 4/2008  | Malladi et al. | 370/329   |
| 2009/0005029 | A1 | * | 1/2009  | Wang et al.    | 455/423   |
| 2009/0175371 | A1 | * | 7/2009  | Zhang et al.   | 375/260   |
| 2010/0020771 | A1 | * | 1/2010  | Ji et al.      | 370/336   |
| 2010/0142476 | A1 | * | 6/2010  | Jiang et al.   | 370/330   |
| 2010/0197330 | A1 | * | 8/2010  | Astely et al.  | 455/507   |

FOREIGN PATENT DOCUMENTS

WO    2008/000914 A1    1/2008
WO    2008123037 A1    10/2008

OTHER PUBLICATIONS

3RD Generation Partnership Project. "CQI Measurement Methodology." 3GPP TSG-RAN WG1 #51, R1-074855, Jeju, Korea, Nov. 5-9, 2007.

* cited by examiner

*Primary Examiner* — Hassan Kizou
*Assistant Examiner* — Emmanuel Maglo
(74) *Attorney, Agent, or Firm* — Coats and Bennett, P.L.L.C.

(57) ABSTRACT

The present invention relates to methods and arrangements for neighbor cell quality measurements using silent resource element (RE) grids, and as well to a silent RE grid.

16 Claims, 16 Drawing Sheets

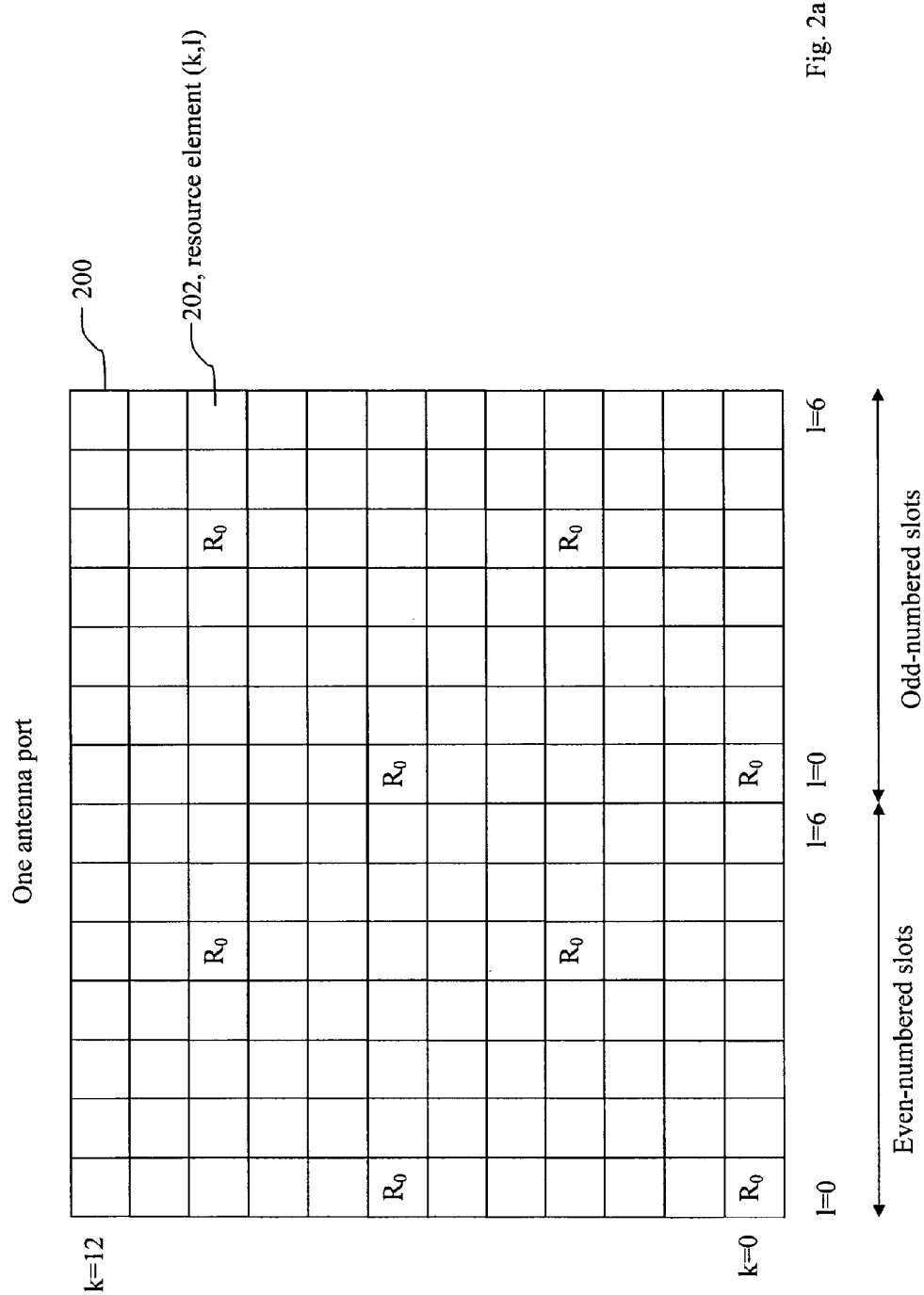

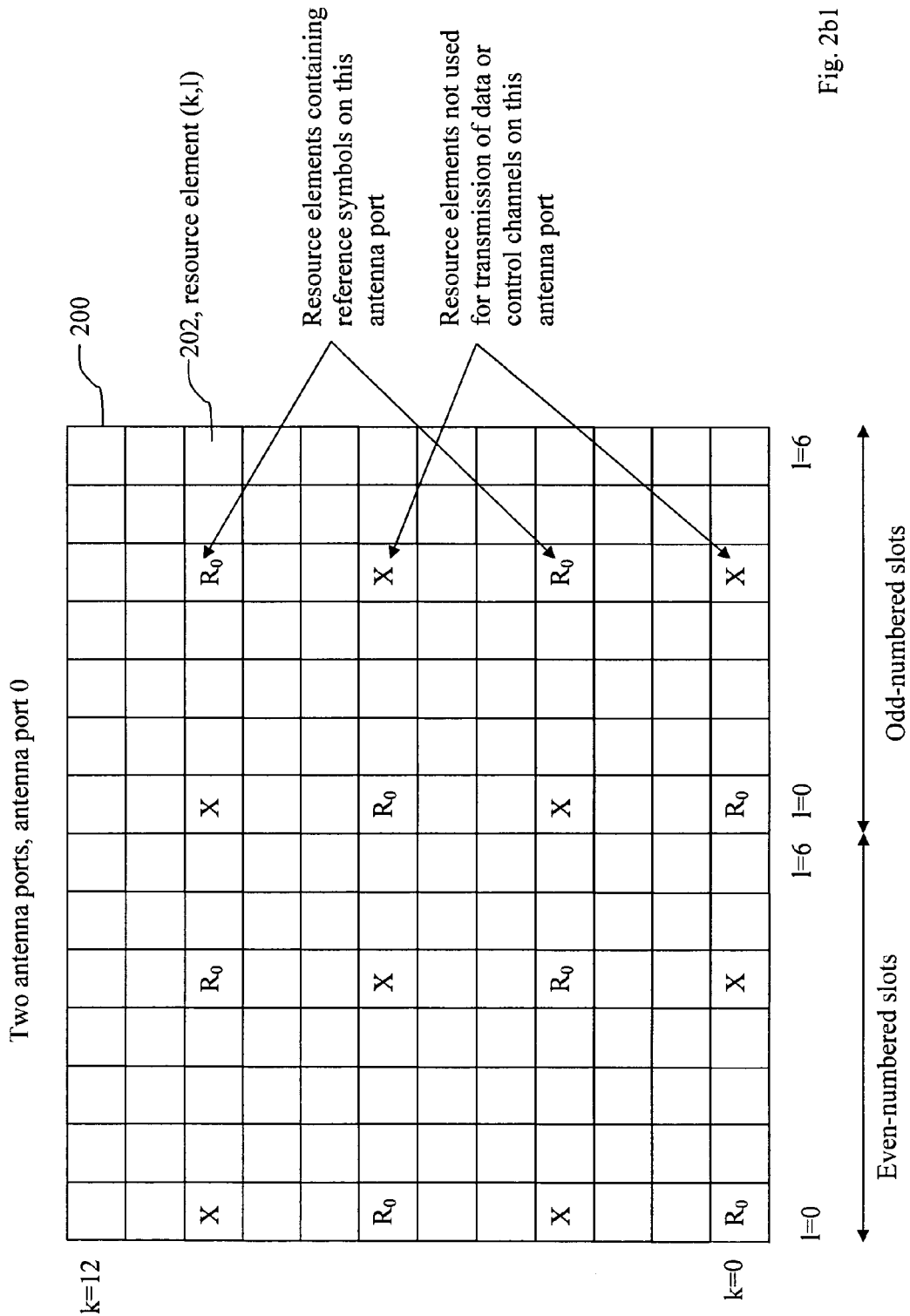
Fig. 2b1

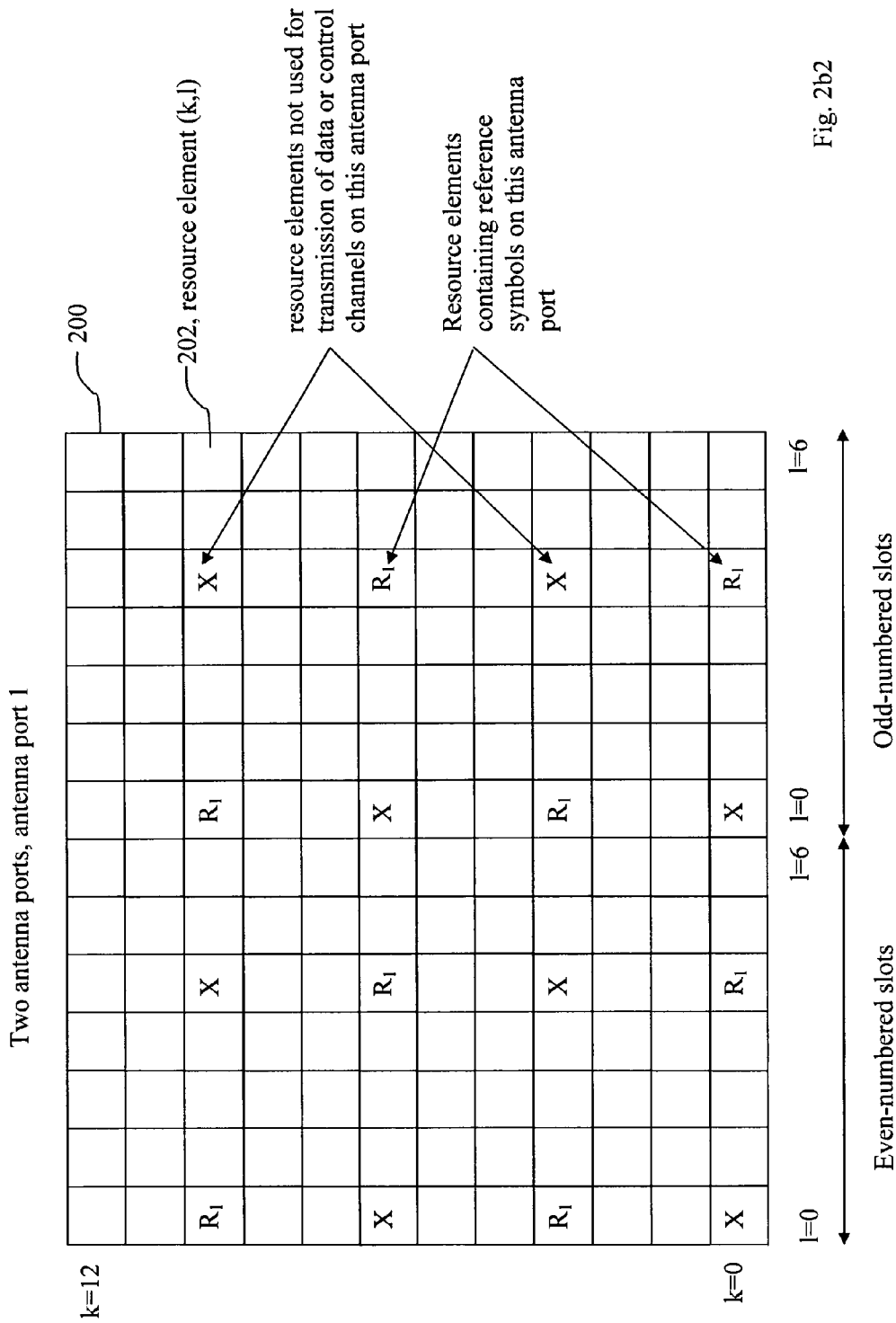
Fig. 2b2

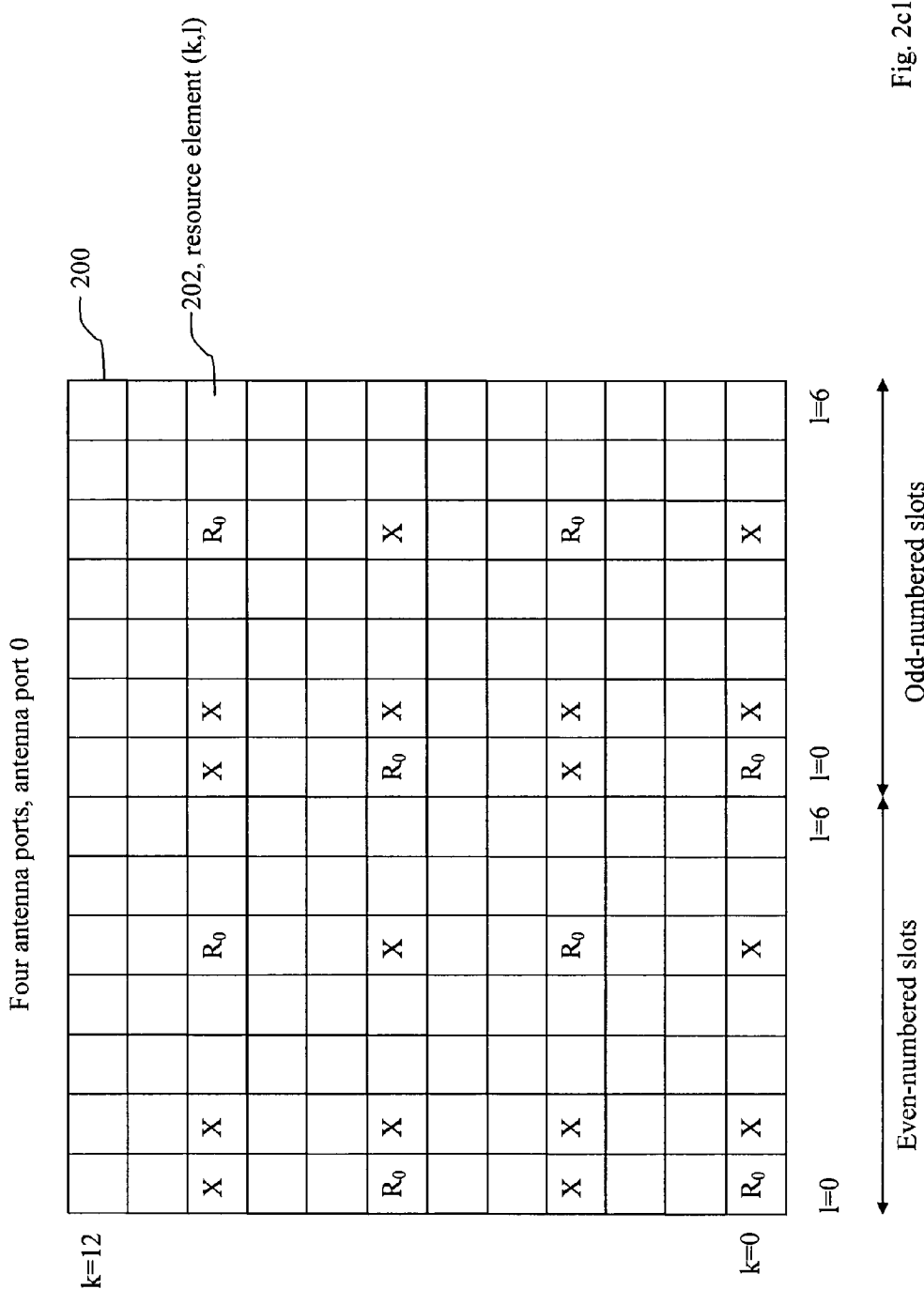
Fig. 2c1

Fig. 2c2

Four antenna ports, antenna port 1

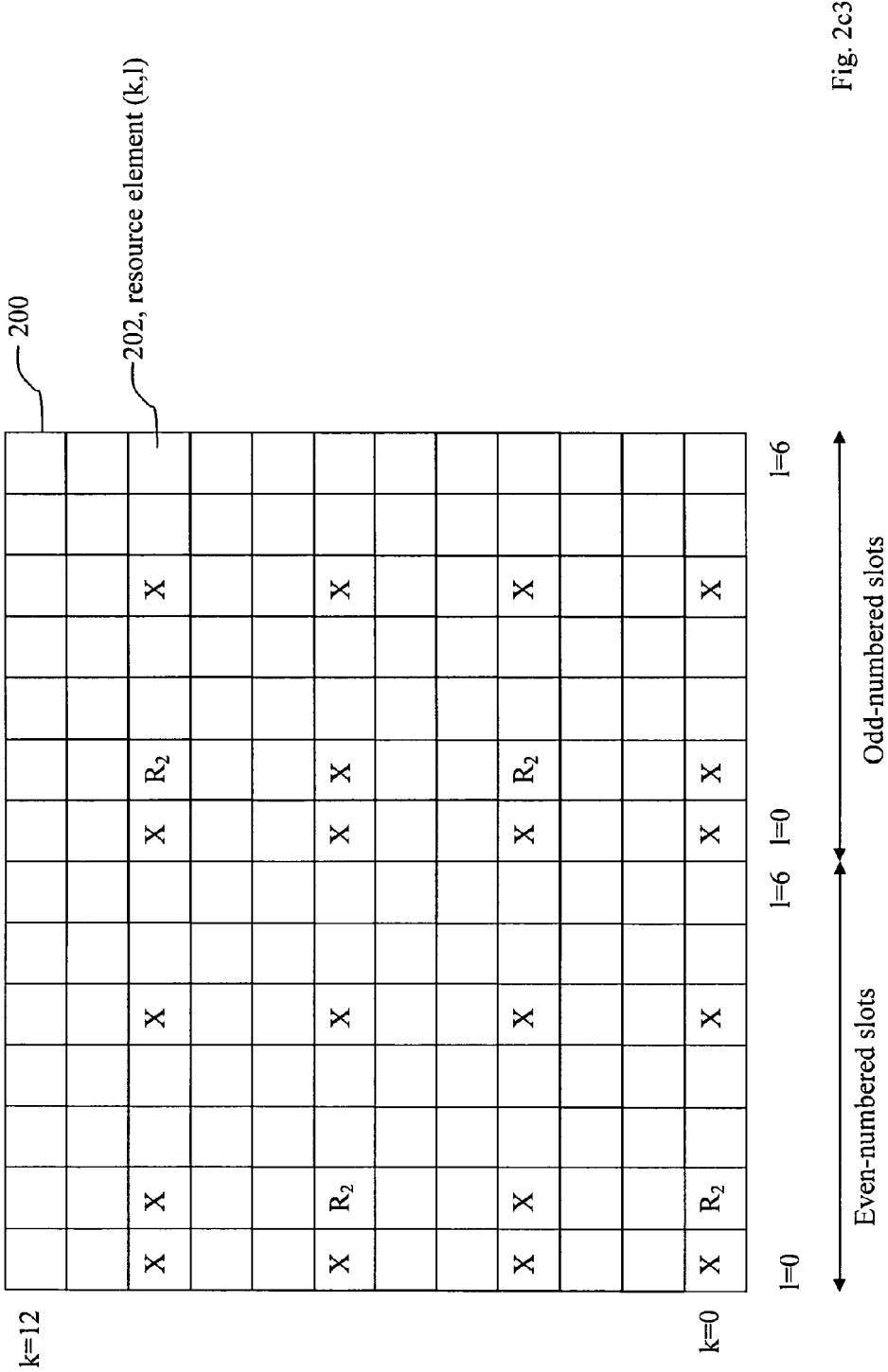
Fig. 2c3

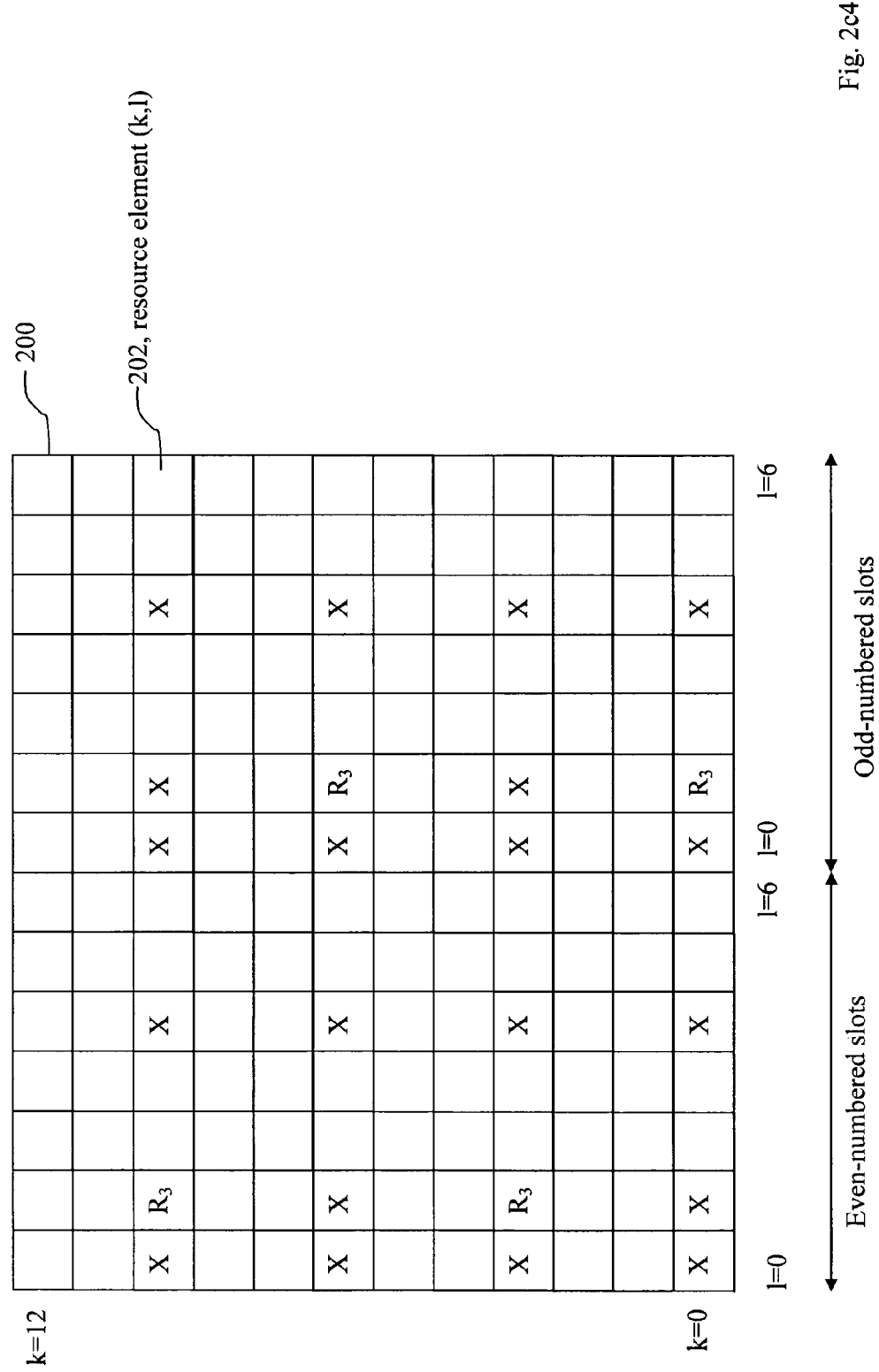
Fig. 2c4

NEIGHBOUR CELL QUALITY MEASUREMENT IN A TELECOMMUNICATIONS SYSTEM

TECHNICAL FIELD

The present invention relates to methods and arrangements in a telecommunications system, in particular it relates to methods and arrangements for neighbour cell quality measurements in a telecommunications system.

BACKGROUND

In E-UTRAN (Evolved-Universal Terrestrial Radio Access Network, also called 3GPP) Orthogonal Frequency Division Multiple Access (OFDMA) technology is used in the downlink. OFDM is a modulation scheme in which the data to be transmitted is split into several sub-streams, where each sub-stream is modulated on a separate sub-carrier. Hence, in OFDMA based systems, the available bandwidth is sub-divided into several sub-channels called resource blocks (RB) or units, in both uplink and downlink. A resource block is defined in both time and frequency. According to the current assumptions, used herein, a resource block size is 180 KHz and 0.5 ms (time slot) in the frequency and time domains, respectively. The resource block size in the time domain, here 0.5 ms, is often called time slot. One or more resource blocks are allocated to a User Equipment (UE) for data transmission. The transmission time interval (TTI) comprises 2 time slots, which correspond to a sub-frame of 1 ms length in time. The radio frame is 10 ms long i.e. comprising of 10 sub-frames, as shown in FIG. 2g. The overall uplink and downlink cell transmission bandwidth can be as large as 20 MHz; other typical bandwidths are 1.4, 3, 5, 10 and 15 MHz. In the case of 20 MHz bandwidth up to 100 resource blocks (RB) containing data and control signalling can be transmitted by the UE in the uplink or by the network, e.g, a base station, in the downlink. The UE can be allocated a sub-set of the resource blocks for reception and transmission of data and control signalling.

Downlink Neighbour Cell Measurements for Mobility

In WCDMA the following three downlink neighbour cell measurement quantities are specified primarily for mobility purposes:
1. Common Pilot CHannel (CPICH) Received Signal Code Power (RSCP), the received power on one code after de-spreading measured on the pilot bits of the CPICH. The reference point for the RSCP is the antenna connector at the UE.
2. CPICH Ec/No; CPICH Ec/No=CPICH RSCP/carrier RSSI, where RSSI=Received Signal Strength Indicator. CPICH Ec/No can be described as the received energy per chip divided by the power density in the band. Measurement is suitably performed on the CPICH. The reference point for CPICH Ec/No is the antenna connector at the UE.
3. UTRA carrier RSSI, can be described as the wide-band received power within the relevant channel bandwidth. Measurement is suitably performed on a UTRAN downlink carrier. The reference point for the RSSI is the antenna connector at the UE.

Reference [1] describes downlink neighbour cell measurements for WCDMA more in detail.

The RSCP is measured by the UE on cell level basis on the common pilot channel (CPICH). The UTRA carrier RSSI is measured over the entire carrier. The UTRA carrier RSSI is the total received power and noise from all cells (including serving cells) on the same carrier. The above CPICH measurements are quantities that are often used for the mobility decisions.

In E-UTRAN the following three downlink neighbour cell measurement quantities are specified also primarily for mobility purposes:
i. Reference symbol received power (RSRP)
ii. Reference symbol received quality (RSRQ): RSRQ=RSRP/carrier RSSI
iii. E-UTRA carrier RSSI Reference [2] describes downlink neighbour cell measurements for E-UTRAN more in detail.

The RSRP or RSRP part in RSRQ is solely measured by the UE on cell level basis on reference symbols. As in the case of WCDMA, the E-UTRA carrier RSSI is measured over the entire carrier. It is also the total received power and noise from all cells (including serving cells) on the same carrier. The two RS based measurement quantities (i. and ii.) are often used for the mobility decisions.

The neighbour cell measurements are averaged over a long time period, in the order of 200 ms or even longer, to filter out the effect of small scale fading.

There is also a requirement on the UE to measure and report the neighbour cell measurements, e.g. of RSRP and/or RSRQ in E-UTRAN, from a certain minimum number of cells. In both WCDMA and E-UTRAN this number is often 8 cells (comprising one serving and seven neighbour cells) on the serving carrier frequency. The serving carrier frequency is commonly called intra-frequency. Hence, the expression "neighbour cell" includes both the serving cell of an UE and the neighbour cells of this serving cell.

Sampling of Neighbour Cell Measurements

The overall neighbour cell measurement quantity results comprises non-coherent averaging of 2 or more basic non-coherent averaged samples. An example of RSRP measurement averaging in E-UTRAN is shown in FIG. 1. The figure illustrates that the UE obtains the overall measurement quantity result by collecting four non-coherent averaged samples or snapshots, each of 3 ms length in this example, during the physical layer measurement period, e.g. 200 ms. Every coherent averaged sample is 1 ms long. In this example a 3 ms non-coherent sample comprises 3 consecutive coherent samples. The measurement accuracy of the neighbour cell measurement quantity, e.g. RSRP or RSRQ, is specified over the physical layer measurement period. It should be noted that the sampling rate is UE implementation specific. Therefore in another implementation a UE may use only 3 snap shots over a 200 ms interval or measurement period. Regardless of the sampling rate, it is important that the measured quantity fulfils the performance requirements in terms of the specified measurement accuracy.

In case of RSRQ both RSRP, numerator, and carrier RSSI, denominator, should be sampled at the same time or instant to follow similar fading profiles on both components.

Mobility Scenarios

There are basically, or at least, two kinds of mobility:
a. Idle mode mobility: cell reselection
b. Connected mode mobility: handover The cell reselection is mainly a UE autonomous function without any direct intervention of the network. But to some extent the behaviour of the UE in this mobility scenario could still be controlled by some broadcasted system parameters and performance specification.

The handover is on the other hand often fully controlled by the network through explicit UE specific commands and by performance specification.

In both idle and connected modes the mobility decisions are mainly based on the same kind of downlink neighbour cell measurements, which were discussed previously.

Both WCDMA and E-UTRAN are frequency reuse-1 systems. This means that the geographically closest or physically adjacent neighbour cells operate on the same carrier frequency. An operator may also deploy multiple frequency layers within the same coverage area. Therefore, idle mode and connected mode mobility in both WCDMA and E-UTRAN could be broadly classified into three main categories:

Intra-frequency mobility (idle and connected modes)
Inter-frequency mobility (idle and connected modes)
Inter-RAT mobility (idle and connected modes)

In intra-frequency mobility the UE moves between the cells belonging to the same carrier frequency. This is an important, maybe even the most important, mobility scenario since it involves less cost in terms of delay due. This mobility scenario involves shorter delay since UE measurements are not done during the measurement gaps. Secondly most handovers and cell reselections are carried out between the cells operating over the same carrier frequency. In addition, an operator would have at least one carrier at its disposal that it would like to be efficiently utilized.

In inter-frequency mobility the UE moves between cells belonging to different carrier frequencies but of the same access technology. This could be considered as a less important mobility scenario than intra-frequency mobility. This is because handover and cell reselection between cells belonging to different carriers are carried out when no suitable cell is available on the serving carrier frequency. Furthermore, UE measurements for inter-frequency mobility are done in gaps. This increases measurement delay and consequently involves longer handover delay compared to that in case of intra-frequency scenario.

In inter-RAT mobility the UE moves between cells that belong to different access technologies such as between WCDMA and GSM or vice versa. This scenario is particularly important in case an operator does not have full coverage of all the supported RATs in its network. During an initial deployment an operator may have limited coverage of the newly deployed technology. Thus inter-RAT handover would ensure ubiquitous service to the users even if all RATs don't have full coverage. Furthermore, an operator may optimize different RATs for different services e.g. GSM for speed, UTRAN for packet data and E-UTRAN for both speech and packet data. Thus if UE switches between speech and packet data or requires both type of services at the same time then if necessary, an inter-RAT handover can be used by the operator to select the most appropriate technology for offering the requested service to the prospective subscriber.

Objectives of Quality Measurements

As indicated above, CPICH Ec/No and RSRQ are so-called neighbour cell quality measurement quantities used in WCDMA and E-UTRAN respectively.

In general the quality measurement ($Q_{rx}$) can be expressed as follows:

$$Q_{rx} = \frac{P_{rx}}{I + N_o} \quad (1)$$

Where, $P_{rx}$ is the received power of the pilot or reference signal or channel, i.e. signal strength part, I is the interference and $N_o$ is the noise. Depending upon the type of quality measurement the component I can be interference on the pilot channel or the total interference on the entire carrier or simply inter-cell interference plus noise. In current quality measurements in WCDMA and in E-UTRAN the interference measurement constitutes the entire interference on the carrier i.e. from the serving and all non serving cells. In reality the noise and the interference within the same measurement bandwidth cannot be separated. This means that the interference measured by the UE would incorporate both the actual interference and the noise i.e. the measured part is the entire denominator ($I+N_o$) in (1).

The goal of the neighbour cell quality measurement is to estimate and predict the long term downlink quality that can be experienced by the UE in a particular cell. It should indeed indicate the signal quality or throughput that the UE will achieve in a cell. This prediction enables the UE and the network to choose the most appropriate cell when performing cell reselection and handovers, respectively. In E-UTRAN any set of resource blocks (i.e. part of the cell bandwidth) can be assigned to the UE for transmission. Therefore the quality measurement should capture the overall long term average quality over the entire bandwidth or at least over the largest possible portion of the bandwidth. This is in contrast with E-UTRAN CQI measurement, which typically depicts short term quality of possibly a sub-set of the resource blocks from the serving cell.

Problems with Existing Solutions

As noted above, the quality measurements include the total interference on the entire carrier in their denominator e.g. RSRQ=RSRP/carrier RSSI. This means that the quality measurement also includes a contribution from the serving-cell signal. Especially in a OFDM based system like E-UTRAN the serving-cell signal introduces negligible intra-cell interference due to good orthogonality between the sub-carriers across the cell bandwidth. In order to correctly track the cell quality the contribution from the serving-cell signal should hence be excluded from the interference measurement part of the neighbour cell quality measurement.

Furthermore, the statistical characteristics of the inter-cell interference may be significantly different, depending on whether the inter-cell interference originates from:

1. reference symbols from neighbouring cells
2. data signaling from neighbouring cells
3. control signaling from neighbouring cells Each of these three categories can have different transmission power and spatial characteristics.

For accurate neighbour cell quality measurement or estimation the UE must have good, statistics, or suitably should obtain statistics or statistical characteristics, of the inter-cell interference that is hitting or affecting the resource elements (RE) in the data channel, which is a mixture of the three categories mentioned above, here referred to as I_d. One may also use the expression, the inter-cell interference from the resource elements (RE) in neighbor cells, where the REs suitably should belong only to the data channel. But the REs may also be a mixture of one or more of the three categories of REs; data signaling, control signaling and reference symbol containing REs.

The statistical characteristics of the inter-cell interference is here referred to as I_d.

In reality, at least often, the inter-cell interference that is hitting or affecting the resource elements (RE) in the data channel is a mixture of the three categories 1, 2 and 3 mentioned above.

Ultimately or suitably, this interference statistics should be measured, or measured and calculated, on the data channel itself. However, this measurement is limited to resource entities, i.e. or e.g. time-frequency resource elements, that contain data scheduled to the particular user or UE doing the measurement since there is only or mainly a good chance of removing the contribution from the serving-cell signal for resources where the UE doing the measurement is scheduled. One may also say, for resources over which the UE is receiving data sent by these resource entities. The limited number of interference samples can significantly penalize the accuracy of the statistics estimate, or of the measured or estimated interference statistics. Moreover, in multiuser-MIMO (MIMO=Multiple Input Multiple Output), i.e. or e.g. spatial division multiple access, systems, several users may be assigned the same data resource elements (RE), which in effect prohibits the UE to separate the inter-cell interference from the intra-cell interference, if the measurement is performed on data REs.

Alternatively, the interference measurement can be performed on REs containing reference symbols (RS). However, the statistics, or the statistical characteristics, e.g. an average interference, of the interference measurement on the neighbour cell RS, corresponding to I_RS, may have significantly different statistics than the interference on the data channel, or the control channel. It may also be the case that the statistical characteristics of the interference measurement, I_RS, on the neighbour cell RS is different, or significantly different, than the statistical characteristics of the interference measurement on the data channel, or of the interference measurement on the control channel. The interference measurement on the neighbour cell RS gives or yields the interference from the neighbour cell RS. There is a limited set of RSs and in particular for MIMO, where the position holding a RS on one antenna is empty for a neighbouring antenna. Alternatively, one may say that for MIMO the time-frequency resources, i.e. the resource elements, containing the RS on different antennas are different. Therefore the interference hitting a RS will to a larger extent, or mainly, come from, or be contributed by, the RSs of the neighbouring cells. For example in lightly loaded systems, I_RS may be significantly different, typically or often substantially larger, than I_d, because possibly data is not allocated to all resource blocks (RB) in the neighbouring cells. The statistics of the measured interference term may therefore deviate significantly from the interference that hits the data channel. The RS grid for a RB in case of 1, 2 and 4 transmit antennas is illustrated in FIGS. 2a-2c4, as the resource grid 200. Between cells, the RS grid may be shifted in the frequency domain. This is because the standard allows the possibility of configuring three possible shifts in frequency domain to allow the randomization of the interference. The frequency shift used in a cell is mapped on to primary synchronization sequence (PSS). Therefore three unique PSS are possible. The frequency shift is detected by the UE during the cell synchronization phase, which requires the detection of PSS. One RS grid may often span over a time slot, 0.5 ms, or a sub-frame, 1 ms, in the time domain and over the entire cell bandwidth (BW) in the frequency domain, see FIGS. 2e-2f. In the frequency domain that is over multiple RBs, e.g. 50 RBs in a cell with 10 MHz BW or 100 RBs in a cell with 20 MHz BW and so forth. Reference sign 202 indicates a resource element, which may be identified by an index (k,l) where l ranges from 0-6 and k from 0 to 12.

For 2 transmitting antennas only three frequency shifts for common RSs exists. This will lead to that not all data interference can be measured. Furthermore, the first three OFDM symbols might see control channel interference instead of data interference. Since control signaling may be differently power controlled than the data signalling, the interference estimate obtained on these RSs may not reflect the interference present when data is transmitted. If common RSs in the later part of a sub-frame is removed, for example because dedicated RSs are inserted instead, it might be necessary to measure interference on data REs.

SUMMARY

The expression "neighbour cell quality measurement" includes measurements performed on or in the serving cell of an UE as well as measurements performed on or in neighbour cells of said serving cell.

In this description, the term "base station" is used to generally represent any network node capable of wireless communication with a user terminal.

A cell specific grid of resource elements wherein a subset of the resource elements are intentionally planned and/or configured to be silent, i.e. to not have data or any type of transmission allocated therein, is called a silent resource element grid.

The first network node may e.g. be a user equipment (UE). The second network node may e.g. be a base station.

It is an object of the present invention to provide a solution for neighbour cell quality measurements in a communications system that at least to a certain extent alleviates one or more of the problems indicated above.

It is also an object of the present invention to provide a solution for neighbour cell quality measurements, which avoids including serving cell contributions in the relevant interference measurements.

At least one of the above objects is achieved with the method/s, arrangement/s, network node/s or resource element grid according to the example aspects and embodiments of the invention herein described.

Further objects and advantages are evident from the following.

Generally there is provided a method, executed in a first network node of a wireless communication system, for measuring neighbour cell quality for mobility purposes.

Said method may comprise the following steps:

Deriving a cell specific grid comprising resource elements having no data allocation, i.e. a silent grid, of a neighbour cell i whose quality is to be measured, Measuring signal interference during said grid over a measurement period, Estimating the quality of the neighbour cell i based on the measured signal interference.

According to one embodiment there is provided a first method, comprising the step of reporting said estimated quality of the neighbour cell i to a second network node.

According to another embodiment there is provided a first method, comprising calculating, measuring and/or estimating the quality of the neighbour cell i as the inter-cell interference that is measured or estimated during the silent resource element grid used in cell i.

According to a further embodiment there is provided a first method, wherein the inter-cell interference comprises the noise and the received power from a data- or control channel, or a combination thereof.

According to yet a further embodiment there is provided a first method, comprising calculating, measuring and/or estimating the quality of the neighbour cell i using signal strength, e.g. Reference Symbol Received Power (RSRP), and interference, e.g. inter-cell interference plus or including noise.

According to yet another embodiment there is provided a first method, comprising calculating, measuring and/or estimating the quality of the neighbour cell i as the Reference Symbol Received Quality (RSRQ) using the following equation:

$$RSRQ=RSRP/(I_{inter-cell}+N_0)$$

Where RSRP=Reference Symbol Received Power, $I_{Inter-cell}$=inter-cell interference measured during the silent resource element grid used in cell i and $N_0$=noise.

According to one embodiment there is provided a first method, comprising defining the position in the silent resource element grid of the data resource elements having no data allocation, as a function of the cell ID of the cell of the silent resource element grid.

According to a further embodiment there is provided a first method, comprising deriving the silent resource element grid for the first network node from the neighbour cell ID of the cell of the silent resource element grid. As an alternative, or in addition, it may be comprised the step of making the silent resource element grid known to the first network node from the neighbour cell ID of the cell of the silent resource element grid.

According to another embodiment there is provided a first method, comprising signaling or sending an index of the silent resource element grid used in a neighbour cell i, to the concerned first network node(s). The index may be sent via at least one control channel, e.g. a primary or a physical broadcast channel (PBCH) and/or a secondary or a dedicated broadcast channel (D-BCH).

According to yet another embodiment there is provided a first method, wherein the secondary or the dedicated broadcast channel (D-BCH) is mapped on, or sent via, a physical downlink shared channel (PDSCH).

Generally there is provided a first arrangement in a first network node. Said first arrangement may comprise at least one of the following elements or means:
  Grid deriving means for deriving a cell specific silent grid, comprising data resource elements with no data allocation, of a neighbour cell i to be quality measured,
  Measuring means for measuring signal interference during said silent grid over a measurement period,
  Computing means for calculating, measuring and/or estimating the quality of the neighbour cell i based on the measured signal interference.

According to one embodiment there is provided a first arrangement, comprising reporting means for reporting said estimated quality of the neighbour cell i to a second network node.

According to another embodiment there is provided a first arrangement, wherein the computing means is adapted for calculating, measuring and/or estimating the quality of the neighbour cell i as the inter-cell interference that is measured or estimated during the silent resource element grid used in cell i.

According to yet another embodiment there is provided a first arrangement, wherein the inter-cell interference comprises the noise and the received power from a data- or control channel, or a combination thereof.

According to a further embodiment there is provided a first arrangement, wherein the computing means is adapted for calculating, measuring and/or estimating the quality of the neighbour cell i using signal strength, e.g. Reference Symbol Received Power (RSRP), and interference, e.g. inter-cell interference plus or including noise.

According to one embodiment there is provided a first arrangement, wherein the computing means is adapted for calculating, measuring and/or estimating the quality of the neighbour cell i as the Reference Symbol Received Quality (RSRQ) using the following equation:

$$RSRQ=RSRP/(I_{inter-cell}+N_0)$$

Where RSRP=Reference Symbol Received Power, $I_{inter-cell}$=inter-cell interference measured during the silent resource element grid used in cell i and $N_0$=noise.

According to another embodiment there is provided a first arrangement, comprising defining means for defining the position in the silent resource element grid of the data resource elements having no data allocation, as a function of the cell ID of the cell of the silent resource element grid (210).

According to a further embodiment there is provided a first arrangement, wherein the computing means is adapted for deriving the silent resource element grid for the first network node from the neighbour cell ID of the cell of the silent resource element grid. As an alternative, or in addition, said computing means is adapted for making the silent resource element grid known to the first network node, from the neighbour cell ID of the cell of the silent resource element grid.

According to one embodiment there is provided a first arrangement, comprising transmitting means for signaling or sending an index of the silent resource element grid used in a neighbour cell i, to the concerned first network node/s, via at least one control channel, e.g. a primary or a physical broadcast channel (PBCH) and/or a secondary or a dedicated broadcast channel (D-BCH).

According to a further embodiment there is provided a first arrangement, wherein the transmitting means is adapted to mapp the secondary or the dedicated broadcast channel (D-BCH) on, or send it via, a physical downlink shared channel (PDSCH).

Generally there is provided a second method executed in a second network node, e.g. a base station, of a wireless communication system. Said second method comprises configuring or designing a silent resource element grid, for use in neighbour cell quality measurements by a first network node of a wireless communication system. Said second method comprises at least one of the following steps;
  configuring at least one of the resource elements in said silent resource element grid to have no data allocation, thereby achieving a silent resource element grid,
  configuring at least some of the resource elements in said silent resource element grid which, i.e the RE, can be used for data transmission, to have no data allocation,
  randomizing the silent resource element grid in consecutive, in frequency and time, resource blocks,
  changing the silent resource element grid, e.g. randomly, in frequency and time.

According to one embodiment there is provided a second method, wherein said silent resource element grid comprises resource elements organized in resource blocks, time slots, sub-frames and frames. Further said second method involves grouping, suitably for each sub frame, the resource blocks into resource windows. Suitably each resource window comprises a group of resource blocks contiguous in frequency.

According to another embodiment there is provided a second method, comprising enumerating all resource elements that are not control or reference symbol signaling. Suitably said enumeration is made for each resource window.

According to a further embodiment there is provided a second method, comprising selecting a specified number of silent resource elements from the set of enumerated resource elements. Said step of selecting may be performed using a pseudo-random number generator that generates numbers uniformly in the range of the enumerated data resource elements. Suitably said step of selecting is made in, or for, each resource window.

According to yet another embodiment there is provided a second method, comprising signaling an index of the silent resource element grid used in a neighbour cell i, to the concerned first network node(s). Said signaling may be made via at least one control channel, e.g. a primary or a physical broadcast channel (PBCH) and/or a secondary or a dedicated broadcast channel (D-BCH).

According to one embodiment there is provided a second method, wherein the secondary or the dedicated broadcast channel (D-BCH) is mapped on, or sent via, a physical downlink shared channel (PDSCH).

Generally there is provided a second arrangement in a second network node, e.g. a base station, of a wireless communication system. Said second arrangement comprises at least one of the following means;

First configuring means for configuring or designing a silent resource element grid, for use in neighbour cell quality measurements by a first network node of a wireless communication system, Second configuring means for configuring at least one of the resource elements in said silent resource element grid to have no data allocation, thereby achieving a silent resource element grid, Third configuring means for configuring at least some of the resource elements in said silent resource element grid which, i.e the RE, can be used for data transmission, to have no data allocation, Randomizing means for randomizing said silent resource element grid in consecutive, in frequency and time, resource blocks, Changing means for changing said silent resource element grid, e.g. randomly, in frequency and time.

According to one embodiment there is provided a second arrangement, wherein said silent resource element grid comprises resource elements organized in resource blocks, time slots, sub-frames and frames. Said second arrangement may comprise organizing means for grouping, suitably for each sub frame, the resource blocks into resource windows. Suitably each resource window comprises a group of resource blocks contiguous in frequency.

According to another embodiment there is provided a second arrangement, comprising enumerating means for, suitably for each resource window, enumerating all resource elements that are not control or reference symbol signaling.

According to a further embodiment there is provided a second arrangement, comprising selecting means for selecting, suitably in each resource window, a specified number of silent resource elements from the set of enumerated resource elements. Suitably said selecting means is adapted to use e.g. using a pseudo-random number generator that generates numbers uniformly in the range of the enumerated data resource elements.

According to yet another embodiment there is provided a second arrangement, comprising transmitting means for signaling or sending an index of the silent resource element grid used in a neighbour cell i, to the concerned first network node/s. Said transmitting means is suitably adapted for signaling or sending said index via at least one control channel, e.g. a primary or a physical broadcast channel (PBCH) and/or a secondary or a dedicated broadcast channel (D-BCH).

According to one embodiment there is provided a second arrangement, wherein the transmitting means is adapted to map the secondary or the dedicated broadcast channel (D-BCH) on, or send it via, a physical downlink shared channel (PDSCH).

Generally there is provided a silent resource element grid in a second network node of a wireless communication system, wherein said silent resource element grid is configured to comprise resource elements, e.g. data resource elements, having no data allocation. Said silent resource element grid may be adapted for use in neighbour cell quality measurements by a first network node of said wireless communication system.

According to one embodiment there is provided a silent resource element grid which is randomized in consecutive, in frequency and time, resource blocks.

The present invention may as well, complementary or alternatively be described as in the following.

A first aspect of the present invention relates to a method in a network node, such as a user equipment (UE), of a wireless communication system, for measuring neighbour cell quality.

A first method step of the first aspect of the invention involves deriving a cell specific grid of data resource elements (REs) with no data allocation, of a neighbour cell i to be quality measured.

This provides the advantage that the assigned base station, e.g. NodeB or eNodeB, will be silent on this grid, hereinafter referred to as the silent RE grid, which cell specific grid is also made known to the assigned node(s), e.g. UE.

Note that the silent RE grid refers to a grid of resource elements (REs) wherein a subset of the resource elements are intentionally planned/configured to be silent, i.e. to not have data allocated therein. This is a definition of the silent grid as it is to be understood throughout the whole description of the present invention.

A second method step of the first aspect of the invention involves measuring signal interference during this silent RE grid.

Here the node measures the statistics of the signal(s) that is/are received on, or during, this silent RE grid. Such signal(s), e.g. denoted $I_{inter-cell-data}$ and $I_{inter-cell-control}$, originates completely from inter-cell signals that interfere with the data- and/or control channel.

The statistics measurement is computationally trivial, because no data must be decoded to obtain the residual noise and interference.

The interference that hit the control channel, $I_{inter-cell-control}$, may be estimated in a similar way as that on the data channel by introducing another silent RE grid on the control channel, i.e., potentially up the first three ODFM symbols in the sub-frame. This is because according to the E-UTRAN standard the first three symbols in a time slot can be allocated for transmitting the control channels e.g. PDCCH or PHICH. In a third method step of the first aspect of the invention the quality of the neighbour cell i is estimated based on the measured signal interference, i.e. the inter-cell interference.

More specifically, the neighbour cell quality measurement for cell i may be derived based on the inter-cell interference estimated or measured during the silent RE grid used in cell i. The inter-cell interference may comprise the received power from the data or control channel or a combination thereof. As an example the RSRQ may be measured or calculated according to Equation (2) below. Both RSRP and the interference parts should be sampled during the same period.

$$RSRQ = \frac{RSRP}{I_{inter-cell} + N_o} \quad (2)$$

Using the silent grid for neighbour cell quality measurements thereby avoids including serving-cell contributions in the relevant interference measurements.

As previously stated, in reality the noise and interference cannot be separated. This means that the inter-cell interference measured by the node, e.g. the UE, would incorporate both the actual inter-cell interference and the noise i.e. the measured part comprises the entire denominator ($I_{inter-cell}$+$N_O$) in (2).

According to one embodiment of this aspect of the invention, the silent RE grid is derived or made known to the network node, e.g. the UE, from the neighbour cell ID. The silent resource element grid may be derived from the neighbour cell ID e.g. by the use of predefined rules, e.g. in the form of a table or a formula. In this context the neighbor cell ID is the cell ID of the cell of the silent resource element grid.

This has the advantage of providing little or no signaling overhead.

Alternatively, an index of the silent grid used in a neighbour cell is signaled to the concerned network node(s), e.g. via a primary or a physical broadcast channel (PBCH) and/or a secondary or a dedicated broadcast channel (D-BCH). The secondary or dedicated broadcast channel may be sent via a physical downlink shared channel (PDSCH).

A second aspect of the present invention relates to a network node, such as a user equipment (UE) or a base station (BS), e.g. NodeB or eNodeB, of a wireless communication system, capable of measuring neighbour cell quality, wherein the node comprises means arranged to perform the method according to the first aspect of the invention.

A third aspect of the present invention relates to a method of configuring, i.e. or e.g. designing, a silent resource element (RE) grid for use in neighbour cell quality measurements by a network node of a wireless communication system, e.g. for use in a neighbour cell quality measurement according to the first aspect of the present invention.

A first method step of the third aspect of the present invention involves grouping, for each sub frame, the resource blocks (RBs) into resource windows (RWs).

Here each resource windows (RW) is preferably a group of contiguous, in frequency, resource blocks (RBs). The number of RBs in each RW is preferably or suitably configured semi-statically. As special cases, there could be only one RW that represent the entire system bandwidth, or there could be a RW for each RB. For neighbour cell quality measurements it should preferably, or may suitably, be over the entire system bandwidth.

A second method step of this aspect of the invention involves enumerating all REs that do not carry, or are not, control signaling, e.g. physical downlink control channel (PDCCH), or reference signal (RS) signaling, for each RW. In other words enumerate all REs that only contain data.

A third method step of this aspect of the invention involves selecting, in each RW, a specified number of silent REs from the set of enumerated REs using a pseudo-random number generator that generates numbers uniformly in the range of the enumerated data REs.

Here the first method step of grouping into RWs will ensure that clustering of silent REs is sufficiently limited. The number of selected silent REs may be fixed, derived from the number of RBs in each RW or semi-statically configured.

According to one embodiment of the third aspect of the invention, the silent RE grid is randomized in consecutive, in frequency and time, resource blocks.

This has the advantage of minimizing the effects of potentially overlapping grids of neighbouring cells.

The grid in each cell can be randomly changed in each cell. This enables that interference is not always measured through the same grid rather on the average over larger number of RE.

A fourth aspect of the present invention relates to a resource element (RE) grid configured to be silent, e.g. according to the third aspect of the invention, for use in a method for measuring neighbour cell quality, e.g. according to the first aspect of the present invention.

The present invention may further be described as in the following.

According to one aspect there is provided a first method executed in a first network node, e.g. a user equipment, of a wireless communication system, for measuring neighbour cell quality for mobility purposes. Said first method may comprise one or more of the following steps;

Deriving a cell specific grid comprising data resource elements with no data allocation, i.e. a silent grid, of a neighbour cell i whose quality is to be measured, Measuring signal interference during said grid, Estimating the quality of the neighbour cell i based on the measured signal interference.

According to one embodiment there is provided a first method, comprising the step of reporting said estimated quality of the neighbour cell i to a second network node.

According to a further embodiment there is provided a first method, wherein the neighbour cell quality measurement for cell i is derived based on the inter-cell interference estimated or measured during the silent resource element grid used in cell i.

According to another embodiment there is provided a first method, wherein the inter-cell interference comprises he received power from a data- or control channel, or a combination thereof.

According to yet a further embodiment there is provided a first method, wherein the quality of the neighbour cell i is calculated, measured and/or estimated as Reference Symbol Received Quality (RSRQ).

According to one embodiment there is provided a first method, wherein the Reference Symbol Received Quality (RSRQ) is calculated using the following equation:

$$RSRQ = RSRP/(I_{inter-cell}+N_0)$$

Where RSRP=Reference Symbol Received Power and $N_0$=Noise.

According to a further embodiment there is provided a first method, wherein the silent resource element (RE) grid is derived or made known to the first network node, e.g. a user equipment, from the neighbour cell identity (ID).

According to one embodiment there is provided a first method, wherein an index of the silent grid used in a neighbour cell i is signaled to the concerned first network node(s), e.g. a user equipment, via e.g. a primary broadcast channel (PBCH) and/or a secondary broadcast channel (D-BCH).

According to a second aspect there is provided a first arrangement in a first network node, e.g. a user equipment, comprising first means arranged to perform the mentioned first method according to any of its embodiments.

According to a third aspect there is provided a second method, executed in a second network node, e.g. a base station, of a wireless communication system. Said second method may comprise configuring i.e. designing, a silent resource element (RE) grid for use in neighbour cell quality measurements by a first network node of a wireless communication system. Said second method may comprise at least one of the following steps;
   Configuring said silent resource element grid to comprise a subset of data resource elements which are planned/configured to be silent, i.e. to not have data allocated therein,
   Randomizing the silent resource element grid in consecutive, in frequency and time, resource blocks,
   Changing said silent resource element grid over time and/or frequency.

According to one embodiment there is provided a second method wherein said silent resource element (RE) grid comprises sub frames. Further, said second method suitably involves grouping, for each sub frame, the resource blocks (RBs) into resource windows (RW). Preferably each resource window (RW) is a group of contiguous, in frequency, resource blocks (RB).

According to one embodiment there is provided a second method involving, for each resource window, enumerating all resource elements that are not control or reference symbol signaling.

According to a further embodiment there is provided a second method, involving selecting, in each resource window, a specified number of silent resource elements from the set of enumerated resource elements. Suitably this is performed using a pseudo-random number generator that generates numbers uniformly in the range of the enumerated data resource elements.

According to a fourth aspect there is provided a resource element grid configured to be silent, e.g. according to any of the aspects or embodiments of the second method, for use in a method for measuring neighbour cell quality, e.g. according to any of the aspects or embodiments of the first method.

The present invention according to the aspects and embodiments thereof herein described provides the advantage of allowing more accurate interference estimation or measurement i.e. substantially only inter-cell interference which is experienced by the UE in practice. Also, or another advantage is that, the neighbour cell quality measurement provides a more accurate prediction of the actual quality of the downlink in a particular cell. A further advantage of the present invention is the improvement of the mobility performance, i.e. or e.g. the improved cell reselection and handovers.

The present invention provides the advantages of:
   allowing more accurate interference estimation i.e. only, or substantially only, inter-cell interference which is experienced by the UE in practice.
   enabling more accurate prediction of the actual quality of the downlink in a particular cell.
   improving the mobility performance, i.e. or e.g. cell reselection and handovers.

Herein described method steps and other features of the invention may be implemented by software executed by a processor in one or several network nodes, such as a mobile terminal also called UE or mobile station, and/or a radio base station also called NodeB or eNodeB.

One suitable example of a silent RE grid is a RE grid where some of the resource elements, such REs which could potentially contain data, are unused, i.e. forming a silent grid.

Any examples and terminology relating to 3GPP LTE standard being used herein should not be seen as limiting the scope of the invention, the methodology of which in principle may be applied to other systems as well, including e.g. WCDMA. It should also be noted that the present invention is in principle equally applicable both in the downlink as well as the uplink of a wireless system.

The features described above in relation to the method/s according to the invention may, where applicable, also be implemented in a arrangement/s according to the invention with the same advantages as described in relation to the method/s.

It goes without saying that all of the above mentioned aspects, embodiments and features of the invention may be freely combined, e.g. in the same embodiment.

BRIEF DESCRIPTION OF DRAWINGS

FIGS. 2a, 2b1, 2b2 and 2c1-2c4 illustrates one example of a reference symbol (RS) or resource grid 200 for a size of two resource blocks (RB) in the time domain in case of 1, 2 and 4 transmitting antennas.

In FIGS. 2e, 2f and 2g these symbols are used to indicate that not all REs or resource element grids are shown, this for sake of clarity.

FIG. 4 is a flowchart schematically illustrating a method, e.g. according to the first aspect, which may be performed in the first, or third, network node. Said method may also be performed in a network node of similar type.

| ABBREVIATIONS | |
| --- | --- |
| UE | User Equipment |
| RB | Resource Block |
| RE | Resource Element |
| RW | Resource Window |
| I_d | Interference on data symbols |
| I_RS | Interference on reference symbols |
| CPICH | Common pilot channel |
| RSRP | Reference symbol received power |
| RSRQ | Reference symbol received quality |

-continued

| ABBREVIATIONS | |
|---|---|
| RSSI | Received signal strength indicator |
| PBCH | Physical or primary broadcast channel |
| PDSCH | Physical downlink shared channel |
| D-BCH | Dedicated or secondary broadcast channel |
| P-SCH | Primary synchronization channel |
| S-SCH | Secondary synchronization channel |
| PSS | Primary synchronization sequence |
| SSS | Secondary synchronization sequence |

DETAILED DESCRIPTION

The, or one, general idea is to measure or estimate the interference part of the neighbour cell quality measurement (e.g. RSRQ) from serving and neighbour cells during silent grid of resource element, or during a silent resource element grid. Currently, or in the background art, the interference part of neighbour cell quality measurement, e.g. RSRQ, includes contribution from the serving cell as well. The methods and arrangements in, or according to, the present invention will ensure that neighbour cell quality measurement, e.g. RSRQ, contains only, or substantially only, inter-cell interference. This will enable more accurate estimation or calculation of RSRQ or quality since in OFDMA intra-cell interference is often negligible.

In the following, various embodiments and alternatives of the invention and its features will be described.

Briefly described, the present invention involves a method/s and arrangement/s for neighbour cell quality measurements in a telecommunications system, using a silent resource element grid.

In more detail, the invention includes the following general steps and features, and example realizations. In the following focus is put on the data channel, but the same approach, with straightforward modifications, may be also applied to estimate the interference that hits the control channel. The invention will partly be described with reference to the drawings but the information stated is not limited to any specific example or embodiment but can be generally deployed or used.

Designing the Silent Grids

Figure 1:
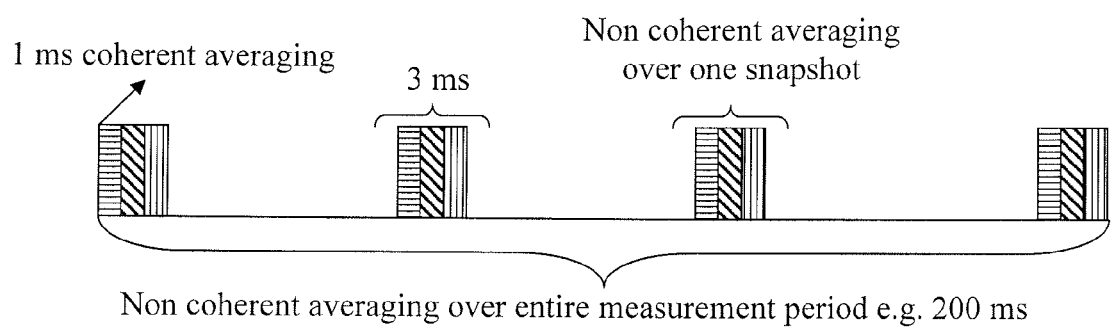
FIG. 1 is an exemplary illustration of RSRP measurement averaging in E-UTRAN.
Figure 2C2:
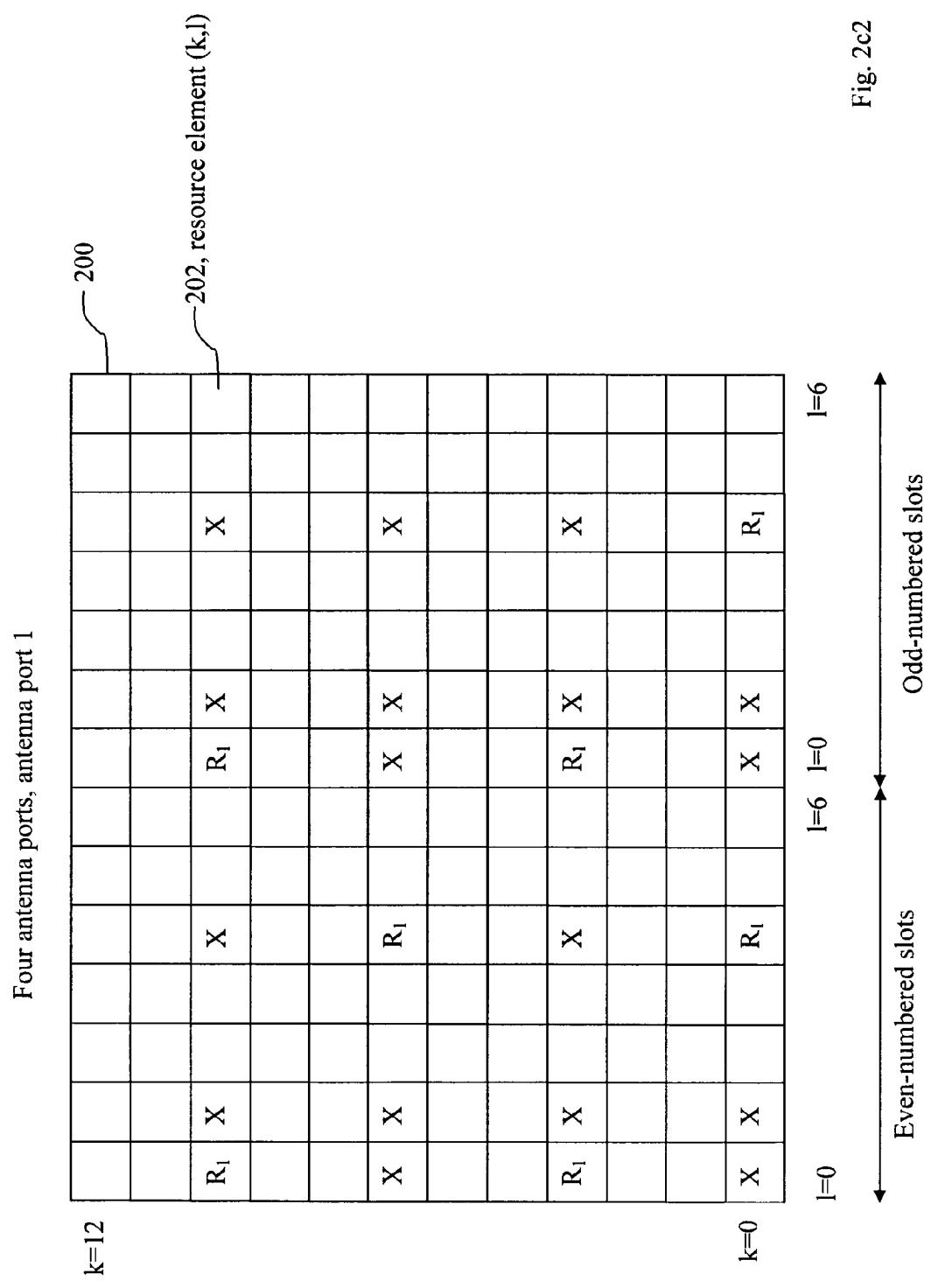
Figure 2D:
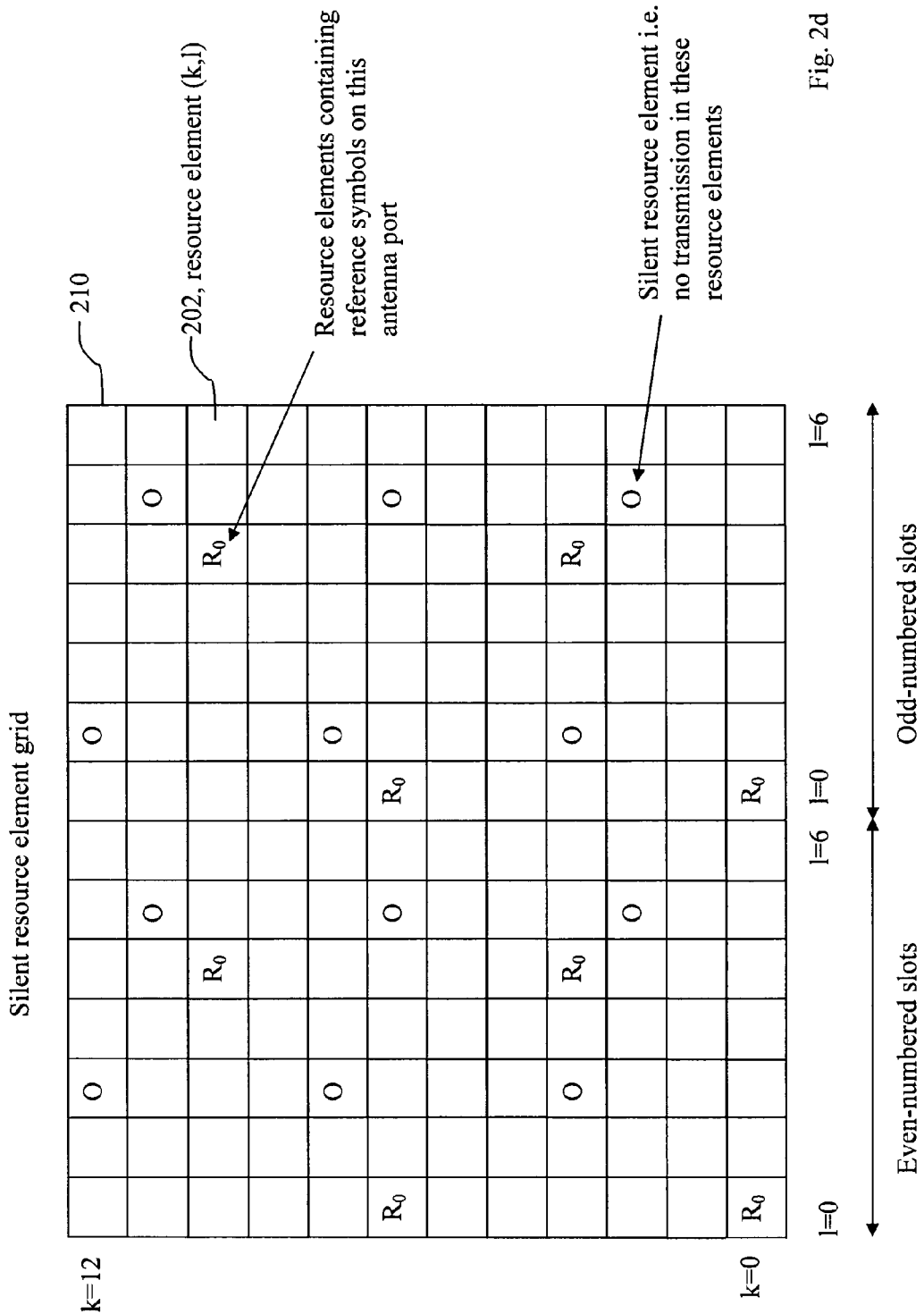
FIG. 2d is an exemplary illustration of a silent grid in the case of one antenna port, illustrating that some of the resource elements, which could potentially contain data are unused, i.e. forming a silent grid.
Figure 2E:
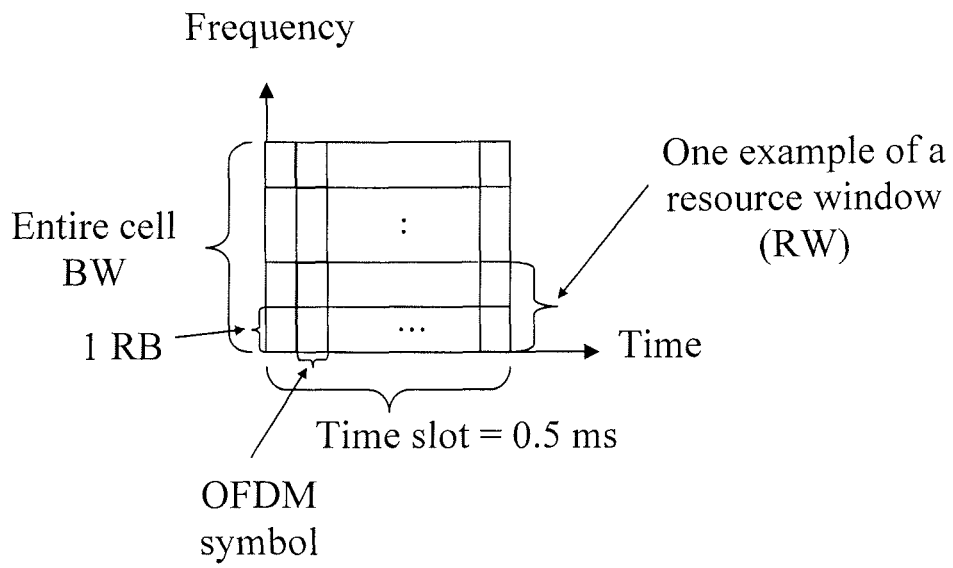
FIGS. 2e, 2f and 2g are figures where OFDM symbol, time slot, RB, RW, sub frame, frame are schematically illustrated in schematically illustrated resource element grid/s. The symbols . . . :
indicate that not all elements are shown.
Figure 2F:
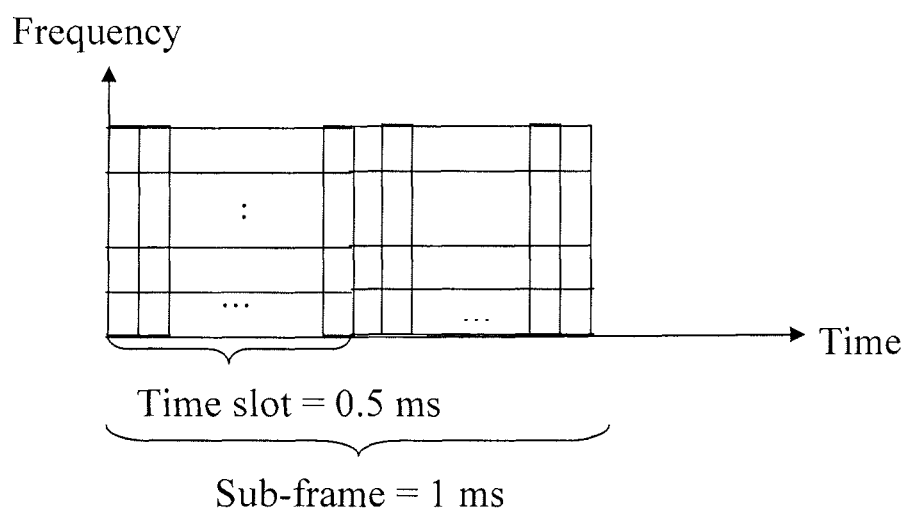
Figure 2G:
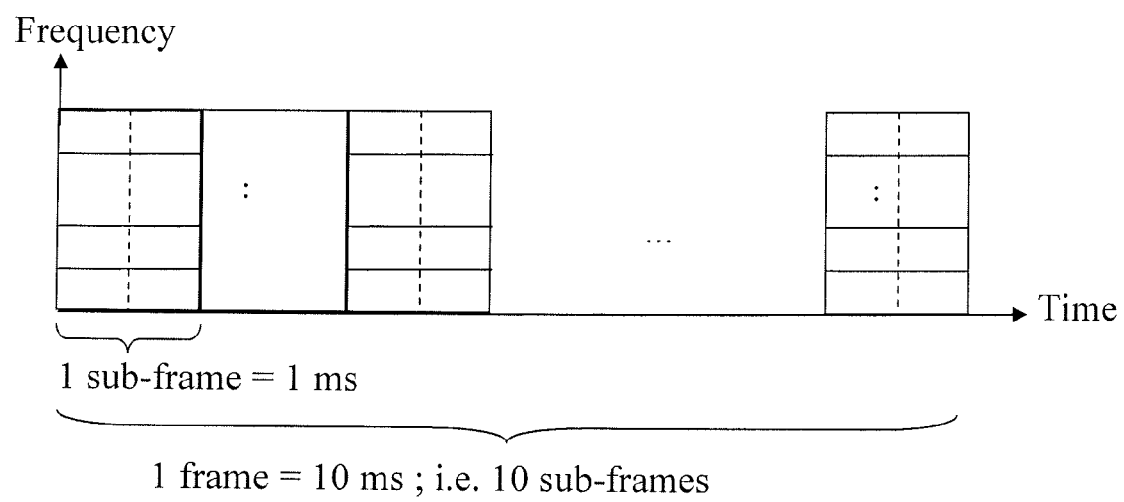

Several aspects should be kept in mind when designing the silent resource element grid, such as the exemplary silent resource grid 210 in FIG. 2d.

1. The interference on, or hitting, the silent resource element grid should suitably reflect the interference statistics of the data channel as a whole. Therefore the distribution of silent REs over the data channel should suitably be as uniform as possible. But also if the distribution of silent REs over the data channel is not as uniform as it could be, using a silent resource element grid is advantageous.

2. The silent resource element grid should preferably or suitably be pseudo-random in the sense that it suitably should change over time and/or frequency to avoid significant long-term overlap with silent grids of neighbouring cells. The silent resource element grid may also be used without being changing over time and/or frequency, e.g. being pseudo-random.

It should be noted that, concerning silent resource element grids changing over time and/or frequency, the invention is not limited to pseudo-random silent resource element grids; for example, an alternative method is to coordinate the silent resource element grids of neighbouring cells such that no significant overlap occur. Such an approach does, or may, however result in significant deployment difficulties as it typically requires careful planning.

3. The UEs should preferably, or suitably, be able to readily derive which silent resource element grid that is being used with little or preferably no control signaling overhead.

Note that the invention is not limited to this constraint, even though it is preferable or suitable; it is conceivable to use explicit signaling of the silent resource element grid layout.

4. Clustering of the silent REs in one or a few RBs should preferably or suitably be avoided for improved sample statistics. This is illustrated by an example below.

a. For example assume there are 2 silent resource elements (RE) every $5^{th}$ resource block (RB) in a cell and maximum of 4 silent RE are allowed in one RB. Hence out of 12 RE in a RB, 4 are silent RE. This means in total there are 4 silent RE per RB in all cells. In case of 10 MHz cell, i.e. containing 50 RB, the entire silent grid per cell comprises of 20 RE i.e. 2 RE every $5^{th}$ RB. Thus in total there are: $10 \times 2 = 20$ unique silent RE grids, which can be used in different cells. This is because in different cells the resource blocks containing the silent RE could be different. For instance in one cell the first RB containing the silent RE is also the first RB in numerological order, the next one is $5^{th}$ and so on. But in another cell the first RB containing the silent RE can be the second RB in numerological order, the next one is $6^{th}$ and so on. This means a silent grid is to be reused after every $20^{th}$ cell in this example.

One scheme that achieves these four criteria is as follows:

For each sub frame the RBs are suitably grouped into resource windows (RW).

Each RW is suitably a group of contiguous, e.g. in frequency, RBs.

The number of RBs in each RW is suitably configured semi-statically.

As special cases, there could be only one RW that represents the entire system bandwidth, or there could be a RW for each RB. For neighbour cell quality measurement it should preferably or suitably be over the entire system bandwidth. That is, it is suitable that one RW represents the entire system bandwidth.

For each RW, suitably all REs that are not control or RS signaling are enumerated In each RW, suitably a specified number of silent REs are selected from the set of enumerated REs, e.g.;

using a pseudo-random number generator that generates numbers uniformly in the range of the enumerated REs, e.g. data REs. The grouping into RWs will ensure that clustering of silent REs is sufficiently limited.

As an alternative to using a pseudo-random number generator it is also possible that the silent resource element grid is altered periodically in all cells. Suitably the UE knows, or is informed of, the current pattern for this periodical alteration in the serving cell. For example a certain pattern may start every frame number k in serving cell 's' whose cell ID is known. The UE can then derive the current pattern for a silent resource element grid in a neighbour cell i from its cell ID, i.e. the cell ID of the neighbor cell i. For example, when cell 's' uses a certain silent resource element grid N, then at the same time cell i uses a certain silent resource element grid M. This relation The number of selected silent REs may e.g. be a) fixed, b) derived from the number of RBs in each RW or c) semi-statically configured.

In alternative a) the number of silent REs depends upon how many REs that it is acceptable to use or sacrifice for the inter-cell interference measurement, instead of using them for e.g. data transmission. The number of silent REs also depends on the cell BW. One may say that the number of silent REs is proportional to the cell BW and/or to the total number of RBs.

In alternative b) this may e.g. be implemented as follows: assuming that it is allowed to have 2 silent REs every $5^{th}$ RB in a cell and a maximum of 4 silent RE in one RB. Then there are a total of 4 silent REs per RB. Hence, out of 12 RE in a RB, 4 are silent RE. Then, if the cell BW is 10 MHz, meaning 50 RBs are present, then the entire silent resource element grid per cell comprises 20 silent? RE.

In total there are: 10×2=20 silent RE grids available. They suitably should be reused after every $20^{th}$ cell.

In alternative c) this may e.g. be implemented as follows: By manual configuration or by an operation and maintenance function which connects to the base station (BS) for configuring various parameters. Another possibility is to use a self optimized network (SON), which automatically configures various BS parameters and which also could configure the silent resource element grid.

The scheme can also readily be generalized to let a RW constitute only a part of a RB in the time domain. For example, the OFDM symbols in the RB can be grouped so that symbols including RS symbols, and data symbols, are mapped to RW_RS and OFDM symbols carrying only data are mapped to RW_d. For example, the OFDM symbols in the RB can be grouped so that symbols including RS symbols, and data symbols, are mapped to RW_RS and OFDM symbols carrying only data are mapped to RW_d. Hence, RW_RS represents a set or group of OFDM symbols which contain only RS in a RB.

It is also conceivable to use a different number of silent REs in RW_RS and, or than in, RW_d. Such a separation of the OFDM symbols can be useful since the inter-cell interference that hit RW_RS and RW_d will have different interference statistics. This in turn would lead to different estimation of downlink quality. For instance from neighbor cell measurement perspective, the interference statistics based on RW_d is beneficial as it would depict the actual cell quality.

Another advantage of the present invention is that the power that may be saved by remaining silent on some REs may be redistributed to boost the power on other REs that carry data or reference symbols. Such power reallocation combined by the preceding method of, or part on, assigning different OFDM symbols to different RW categories, can be a useful approach to reallocate the power within OFDM symbols. This for example in order to support different powers on the REs carrying RS and the REs carrying data in the same OFDM symbol.

Determining the Silent RE Grid

As indicated in the preceding, it is, or may be, beneficial to let the silent RE grid be generated pseudo-randomly to transparently avoid consistent grid-overlap, or overlap of silent resource element grids, with neighbouring cells. It is therefore necessary or suitable to synchronize the pseudo-random generators used at the NodeB, or base station, with those in the UEs. A simple or straight forward scheme for synchronizing the pseudo-random generators is to reinitialize the pseudo-random generators in each frame using a seed that is derived from:

1. Cell identity (cell ID) to provide uniqueness for each cell.
2. Frame index to provide hopping over time.

Both the cell ID and the frame index are available at the UEs. In E-UTRAN the cell ID is mapped on the synchronization channel, SCH, (P-SCH or PSS and S-SCH or SSS) as well as on the reference symbols. Therefore the UE acquires the entire cell ID from P-SCH or PSS and S-SCH or SSS signals during the synchronization procedure of each cell. The UE has to acquire the cell ID of all the necessary neighbour cells. This means it, or the UE, can easily derive the silent RE grid used in all the neighbour cells without reading any additional information such as a/the broadcast channel. In this case the procedure is, or can be, as follows: The UE first acquires the silent RE grid in a cell and then measures the interference during this silent RE grid. This in turn is used to measure or calculate the neighbour cell quality of this particular cell.

Note that any re-initialization interval of the pseudo-random number generator can be used as long as there is a suitable index available at the UE and that can be used to progress the seed over time; this includes, but is not limited to, a sub frame, or groups of frames.

Another possibility is that in E-UTRAN the seed or the index of the silent RE grid used in a cell is signaled via the primary or the physical broadcast channel (P-BCH or PBCH) rather than being mapped to the cell ID. It is relatively easier for the UE to read the P-BCH or the PBCH compared to the full fledge dedicated broadcast channel (D-BCH), which is mapped on to downlink shared channel, i.e. PDSCH (Physical Downlink Shared CHannel). The D-BCH contains the entire system information, which is transmitted in the form of blocks of data called as system information blocks (SIB). But in principle the seed or index of the silent RE grid can also be transmitted via D-BCH. In another embodiment, or as an alternative, the silent grid RE, or silent resource element grid, information sent in a cell can be split into two parts: one static part mapped on cell ID and one semi-static part transmitted via a broadcast channel i.e. P-BCH, PBCH or D-BCH. In either of these methods or cases, which use P-BCH, PBCH, or D-BCH, the UE will have to first read the P-BCH, PBCH or D-BCH, depending on where it is sent or which channel that is used, of a neighbour cell to acquire the complete information about the silent RE grid used in that cell. After acquiring the silent grid RE pattern, or the pattern of the silent resource element grid, the UE shall perform the neighbour cell quality measurement.

An, or one, important aspect of the invention is, as already mentioned, that the inter-cell interference for neighbour cell quality measurement from, or regarding, cell i is measured during the silent RE grid in cell i, thus avoiding the contribution from serving-cell signal into the interference statistic. The inter-cell interference estimation is further elaborated in the following.

Measuring the Inter-Cell Interference

The silent RE grid is used by the UEs to collect statistics of the inter-cell interference that hit the data channel or the control channel. If the silent RE grid is uniformly distributed over the data channel, as suggested in the preceding, the interference samples collected in the silent RE grid will, over time, be the same as the interference that hit the data channel as a whole. These samples can thus be utilized by the UE to estimate:

The inter-cell interference power that hits the data channel.
The co-variance matrix of the inter-cell interference that hits the data channel. This is particularly useful if the UE has multiple antennas The full probability distribution of the inter-cell interference.

The measured statistics can be averaged over time and frequency, in a similar manner as the approach proposed in reference [3]. One important difference is that in case of the neighbor cell quality measurement the averaging in time is done over considerably longer period of time compared to that used for CQI estimation. In case of CQI the averaging is over one or more sub-frames. This is further explained below.

The silent resource element grid is suitably continuously available, e.g. in every sub-frame, i.e. every 1 ms. But the neighbour cell quality measurement is done over a certain measurement period using periodical samples e.g. over a measurement period of 200 ms where each sample may be of 2 ms and may be taken with 50 ms periodicity, i.e. 4 samples of 2 ms in a 200 ms measurement period in this example.

As explained in the preceding sections, this inter-cell interference measurement sample will be used in Equation (1) or more specifically in Equation (2) to obtain the cell quality measurement i.e. or e.g. RSRQ. But the invention is applicable to any type of quality measurement which incorporates the interference component.

Figure 3:
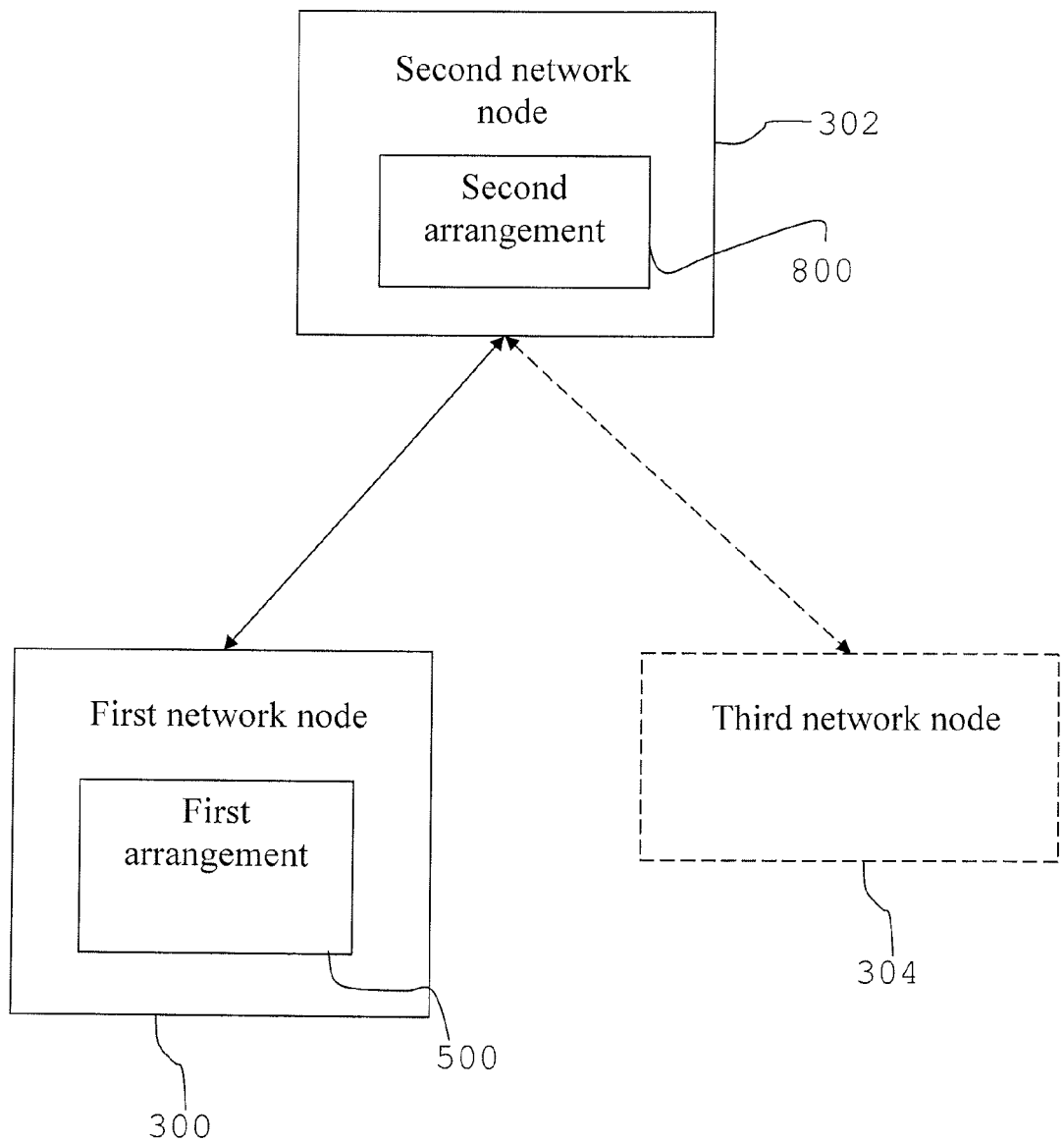
FIG. 3 is an exemplary schematic drawing of a network where the present methods and arrangements may be used.
Figure 5A:
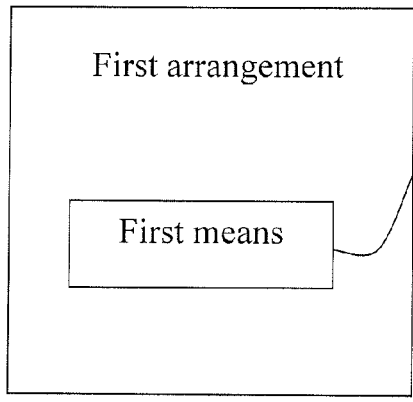
FIG. 5a is a drawing schematically illustrating one example of a first arrangement, which e.g. may be present in a first network node, and/or in a network node according to the second aspect.
Figure 5B:
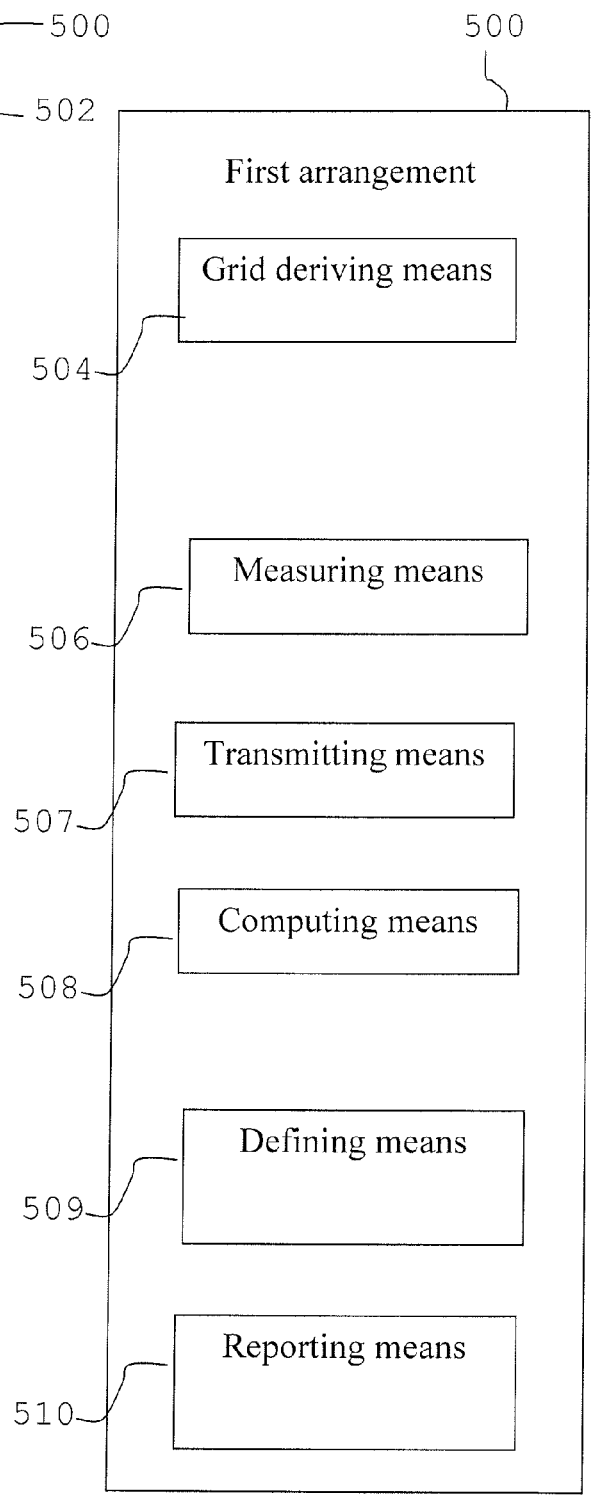
FIG. 5b is a drawing schematically illustrating another example of a first arrangement, which e.g. may be present in a first network node, and/or in a network node according to the second aspect.

With the above understanding of the drawings in mind, FIG. 3 illustrates a network that includes three network nodes, 300, 302, and 304. The node 300 includes a first arrangement 500, e.g., processing circuitry. In one embodiment, the first arrangement 500 comprises a part 502 as illustrated in FIG. 5a. In another embodiment, the first arrangement 500 (comprising parts 504, 506, 507, 508, 509, and 510 illustrated in FIG. 5b) is configured to: derive a cell-specific silent grid of a neighbor cell to measure a quality of the neighbor cell, the cell-specific silent grid comprising data resource elements with no data allocation; measure an inter-cell interference during said silent grid over a measurement period; and estimate the quality of the neighbor cell based on the measured signal interference.

Figures 8, 9:
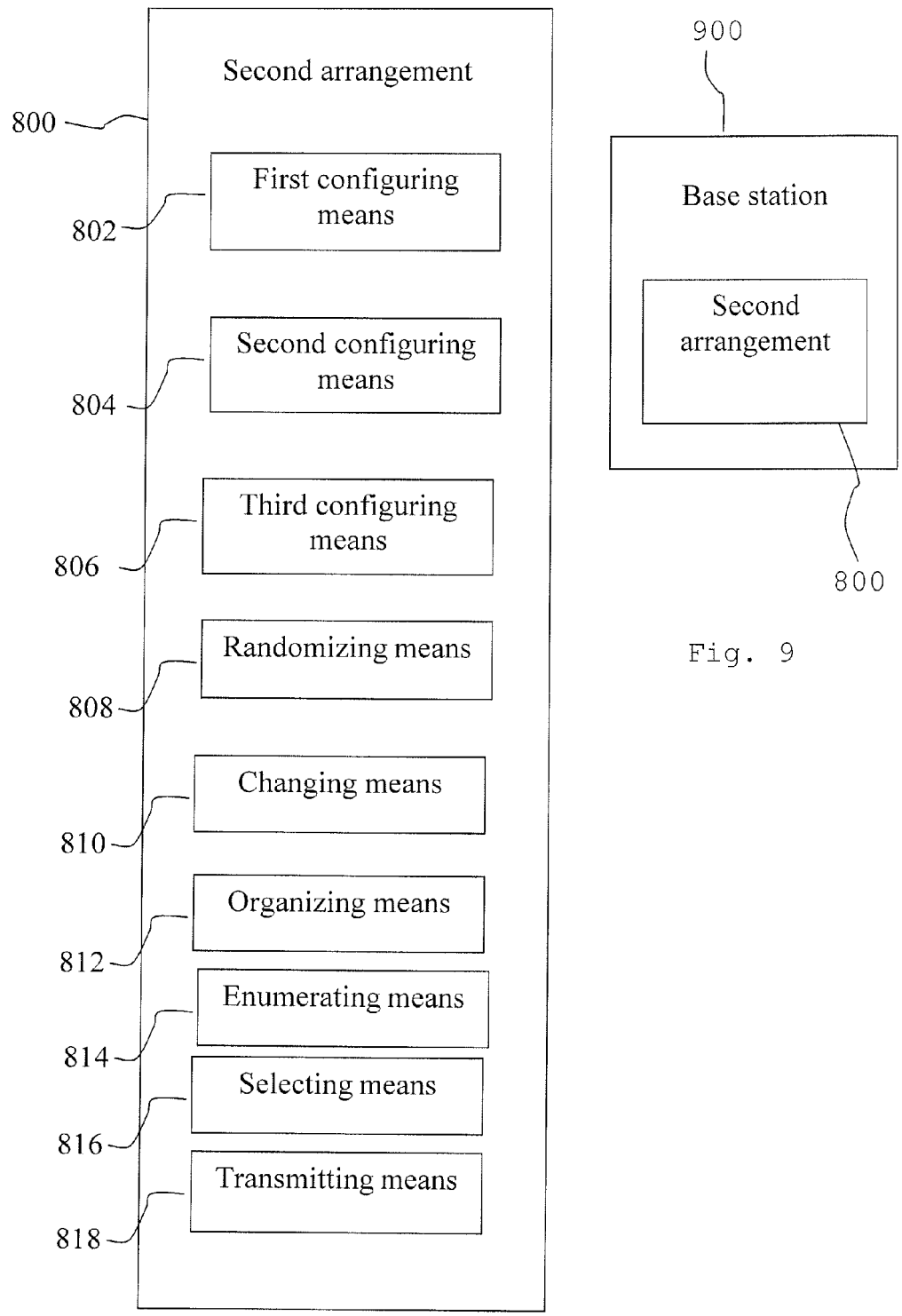
FIG. 8 is a drawing schematically illustrating one example of a second arrangement, which e.g. may be present in a second network node, and/or in a network node according to the second aspect.
FIG. 9 is a drawing schematically illustrating one example of a base station (BS)

Correspondingly, the second network node 302 includes a second arrangement 800. In one embodiment, the second arrangement 800, comprising parts 802, 804, 806, 808, 810, 812, 814, 816, and 818 as illustrated in FIG. 8, is configured to determine a silent resource element grid, for use in neighbor cell quality measurements by a first network node of a wireless communication system, e.g., by the node 300. Additionally or alternatively, the second arrangement 800 is configured to achieve the silent resource element grid by configuring one or more resource elements in the grid to have no data allocation. Additionally or alternatively, the second arrangement 800 is configured to randomize the silent resource element grid (702) in resource blocks that are consecutive in frequency and time. Additionally or alternatively, the second arrangement 800 is configured to change the silent resource element grid, e.g. randomly, in frequency and time. Additionally or alternatively, the second arrangement 800 is configured to group the resource blocks in each sub frame into resource windows. Additionally or alternatively, the second arrangement 800 is configured to enumerate all resource elements that are not used for control or reference symbol signaling and to select a specified number of silent resource elements from the enumerated resource elements by using a pseudo-random number generator to generate random numbers uniformly distributed in the range of the enumerated resource elements. Additionally or alternatively, the second arrangement 800 is configured to transmit an index of the silent resource element grid used in the neighbor cell to the first network node via at least one control channel.

Figure 4:
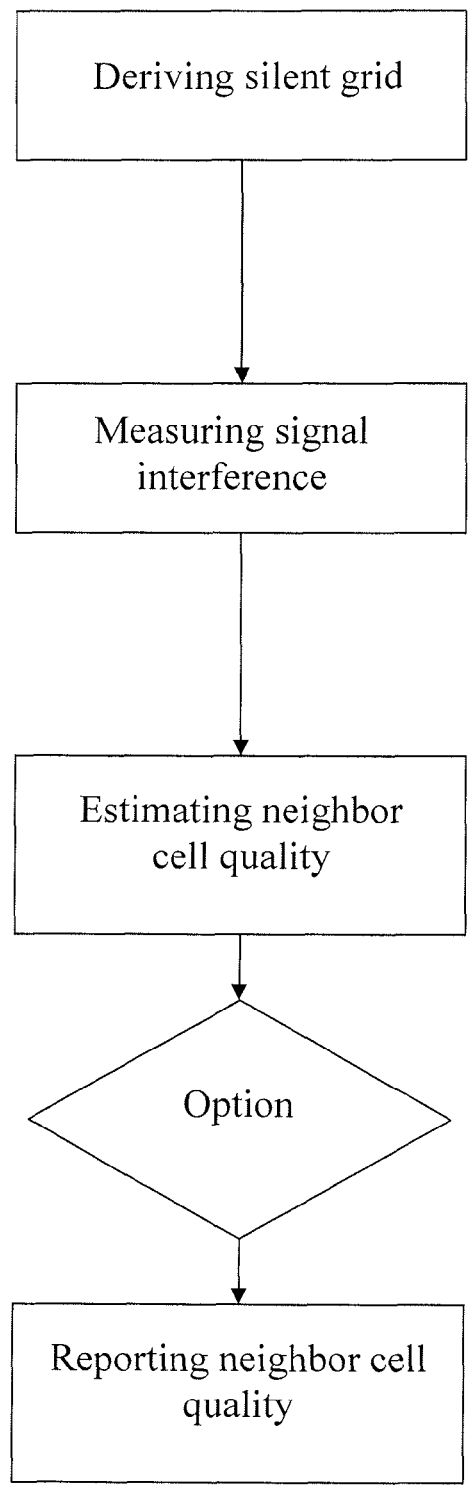
Figure 6:
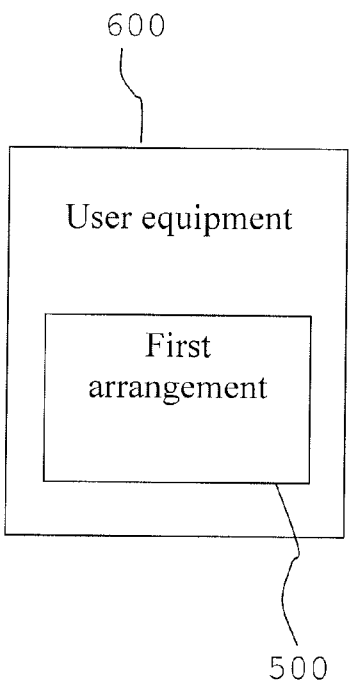
FIG. 6 is a drawing schematically illustrating one example of a user equipment (UE)

The first arrangement 500 may be implemented in a user equipment 600 shown in FIG. 6 and an exemplary flowchart of the innovative methods carried out by the first arrangement 500 is illustrated in FIG. 4.

Figure 7:
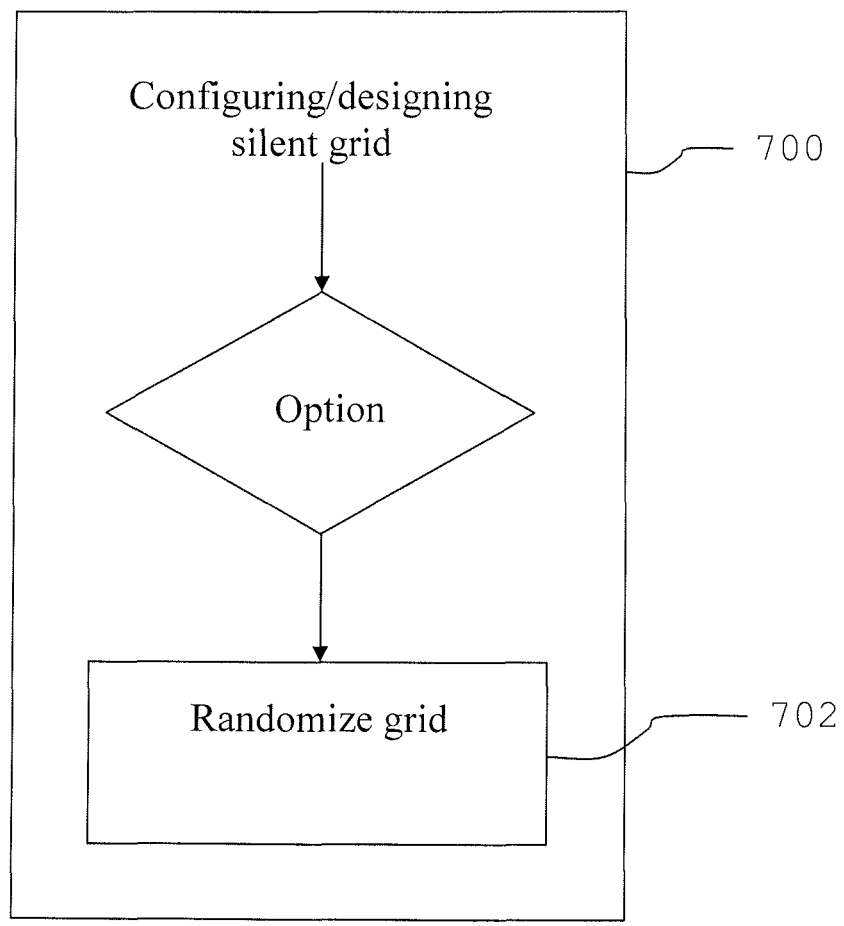
FIG. 7 is a flowchart schematically illustrating a method, e.g. according to the third aspect, which may be performed in the second network node. Said method may also be performed in a network node of similar type.

The second arrangement 800 may be implemented in a base station 900 as shown in FIG. 9 and an exemplary flowchart of the innovative methods associated with the second arrangement 800 is illustrated in FIG. 7.

The described subject matter is of course not limited to the above described embodiments, alternatives and examples, but can be modified within the scope of the general concept of the invention.

REFERENCES

[1] 3GPP TS 25.215, "Physical layer measurements (FDD)".
[2] 3GPP TS 36.214, "Evolved Universal Terrestrial Radio Access (E UTRA); Physical layer measurements".
[3] R1-074855, CQI Measurement Methodology, Ericsson, 3GPP RAN 1 #51, Korea.

The invention claimed is:

1. A method, executed in a first network node of a wireless communication system, for measuring a quality of a neighbor cell for mobility purposes, the method comprising:
obtaining a cell-specific silent grid for measuring the quality of a neighbor cell, the cell-specific silent grid comprising resource elements having no data allocation;
measuring signal interference over said grid during a measurement period in one or more of the resource elements of said grid having no data allocation; and
estimating the quality of the neighbor cell based on the measured signal interference;
wherein the quality of the neighbour cell is calculated based on an inter-cell interference measured or estimated during the cell-specific silent grid by using signal strength and interference.

2. A method according to claim 1, further comprising a step of reporting said estimated quality of the neighbor cell to a second network node.

3. A method according to claim 1, wherein the inter-cell interference comprises noise and a received power from a data channel or a control channel, or a combination thereof.

4. A method according to claim 1, further comprising calculating the quality of the neighbor cell as a Reference Symbol Received Quality (RSRQ) using the following equation:

$$RSRQ = RSRP/(I_{inter-cell} + N_0),$$

where RSRP=Reference Symbol Received Power, $I_{inter-cell}$=inter-cell interference measured during the silent resource element grid used in cell i, and $N_0$=noise.

5. A method according to claim 1, further comprising defining a position in the cell-specific silent grid of the resource elements having no data allocation, as a function of a cell ID of the cell corresponding to the cell-specific silent grid.

6. A method according to claim 1, further comprising
deriving the cell-specific silent grid for the first network node, from a cell ID of the neighbor cell; and
making the cell-specific silent grid known to the first network node.

7. A method according to claim 1, further comprising signaling or sending an index of the cell-specific silent grid, to the first network node, via at least one control channel.

8. A method according to claim 7, wherein the at least one control channel is a broadcast channel mapped on, or sent via, a physical downlink shared channel (PDSCH).

9. An arrangement in a first network node, comprising a transceiver and a processor, said processor configured to:
   obtaining a cell-specific silent grid to measure a quality of a neighbor cell, the cell-specific silent grid comprising data resource elements with no data allocation;
   measure an inter-cell interference during said silent grid over a measurement period in one or more of the data resource elements of said silent grid with no data allocation; and
   estimate the quality of the neighbor cell based on the measured signal interference;
   wherein the quality of the neighbour cell is calculated as an inter-cell interference measured or estimated during the cell-specific silent grid by using signal strength and interference.

10. A arrangement according to claim 9, further configured to report said estimated quality of the neighbor cell to a second network node.

11. An arrangement according to claim 9, wherein the inter-cell interference comprises noise and a received power from a data channel or control channel, or a combination thereof.

12. An arrangement according to claim 9, wherein the first arrangement is configured to estimate the quality of the neighbor cell based on calculating a Reference Symbol Received Quality (RSRQ) using the following equation:

$$RSRQ=RSRP/(I_{inter-cell}+N_0),$$

where RSRP=Reference Symbol Received Power, $I_{inter-cell}$=inter-cell interference measured during the cell-specific silent grid used in the neighbor cell and $N_0$=noise.

13. An arrangement according to claim 9, further configured to define the position in the cell-specific silent grid as a function of a cell ID of the neighbor cell.

14. An arrangement according to claim 9, wherein:
   the cell-specific silent grid is derived from a cell ID of the neighbor cell; and
   the cell-specific silent grid is made known to the first network node.

15. An arrangement according to claim 9, further configured to transmit an index of the cell-specific silent grid to the first network node, via one or more control channels.

16. An first arrangement according to claim 15, wherein the arrangement is configured to transmit the index of the cell-specific silent grid via a secondary or a dedicated broadcast channel (D-BCH), or a physical downlink shared channel (PDSCH).

* * * * *